(12) United States Patent
Irie et al.

(10) Patent No.: US 10,345,641 B2
(45) Date of Patent: Jul. 9, 2019

(54) LIQUID CRYSTAL DISPLAY APPARATUS AND METHOD OF DRIVING LIQUID CRYSTAL DISPLAY APPARATUS

(71) Applicant: Sakai Display Products Corporation, Sakai-shi, Osaka (JP)

(72) Inventors: Kentaro Irie, Sakai (JP); Masae Kitayama, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 100 days.

(21) Appl. No.: 15/329,492

(22) PCT Filed: Dec. 18, 2014

(86) PCT No.: PCT/JP2014/083608
§ 371 (c)(1),
(2) Date: Jan. 26, 2017

(87) PCT Pub. No.: WO2016/098232
PCT Pub. Date: Jun. 23, 2016

(65) Prior Publication Data
US 2017/0322449 A1     Nov. 9, 2017

(51) Int. Cl.
*G02F 1/1335* (2006.01)
*G09G 3/36* (2006.01)
(Continued)

(52) U.S. Cl.
CPC ...... *G02F 1/133514* (2013.01); *G02F 1/1337* (2013.01); *G02F 1/133528* (2013.01);
(Continued)

(58) Field of Classification Search
CPC .......... G09G 2320/028; G09G 3/3648; G09G 2320/068; G09G 2320/0276;
(Continued)

(56) References Cited

U.S. PATENT DOCUMENTS

| 5,900,863 A | 5/1999 | Numazaki |
|---|---|---|
| 6,958,791 B2 | 10/2005 | Shimoshikiryo |

(Continued)

FOREIGN PATENT DOCUMENTS

| JP | 2004-62146 A | 2/2004 |
|---|---|---|
| JP | 2006-133577 A | 5/2006 |

(Continued)

OTHER PUBLICATIONS

Kim et al., 82" Ultra Definition LCD Using New Driving Scheme and Advanced Super PVA Technology, SID Symposium Digest of Technical Papers, May 2008, 39(1):196-199.

(Continued)

*Primary Examiner* — Duc Q Dinh
(74) *Attorney, Agent, or Firm* — Rudy J. Ng; Bret E. Field; Bozicevic, Field & Francis LLP

(57) ABSTRACT

Provided are a liquid crystal display apparatus and a method for driving a liquid crystal display apparatus capable of effectively suppressing the deterioration in gamma characteristics even when an angle between a normal line to a display screen from a position of observation and an observer's line of sight is relatively large. Pixels P, arranged in a matrix, are defined to include a plurality of pairs of electrodes for applying a voltage to a liquid crystal layer. Each of two subpixels included in each pixel P is defined to include a pair of electrodes consisting of a subpixel electrode and a counter electrode. A pair of electrodes in each of the two subpixels included in the pixel P (including a pair of electrodes in a third subpixel which may also be included in the pixel P) applies a voltage to the crystal liquid layer. A voltage difference between any two voltages applied to the crystal liquid layer is set to vary in accordance with the arrangement position of the pixel P along the rows and/or columns of the matrix.

22 Claims, 20 Drawing Sheets

(51) Int. Cl.
*G02F 1/1337* (2006.01)
*G02F 1/01* (2006.01)
*G02F 1/137* (2006.01)

(52) U.S. Cl.
CPC .......... *G09G 3/3607* (2013.01); *G09G 3/3648* (2013.01); *G02F 1/0123* (2013.01); *G02F 1/137* (2013.01); *G09G 2320/0261* (2013.01); *G09G 2320/0285* (2013.01); *G09G 2354/00* (2013.01); *G09G 2360/16* (2013.01)

(58) Field of Classification Search
CPC ......... G09G 3/2074; G09G 2320/0233; G09G 3/3291; G09G 2300/0465; G09G 2300/0447; G09G 2300/0443; G09G 2320/0209
USPC .................................................... 345/98–100
See application file for complete search history.

(56) References Cited

U.S. PATENT DOCUMENTS

| | | | |
|---|---|---|---|
| 7,079,214 | B2 | 7/2006 | Shimoshikiryo |
| 7,283,192 | B2 | 10/2007 | Shimoshikiryo |
| 7,688,393 | B2 | 3/2010 | Ueda et al. |
| 7,782,346 | B2 | 8/2010 | Akiyama |
| 7,883,415 | B2 | 2/2011 | Larsen et al. |
| 7,911,498 | B2 | 3/2011 | Shen |
| 8,149,101 | B2 | 4/2012 | Ueno |
| 8,159,432 | B2 | 4/2012 | Naruse et al. |
| 8,576,261 | B2 | 11/2013 | Yoshida et al. |
| 8,698,850 | B2 | 4/2014 | Irie et al. |
| 8,890,812 | B2 | 11/2014 | Billerbeck |
| RE45,283 | E | 12/2014 | Shimoshikiryo |
| 8,963,831 | B2 | 2/2015 | Coulon |
| 8,976,098 | B2 | 3/2015 | Fan et al. |
| 8,994,653 | B2 | 3/2015 | Gärdenfors et al. |
| 9,076,360 | B2 | 7/2015 | Kim et al. |
| 9,099,035 | B2 | 8/2015 | Shin et al. |
| 9,099,037 | B2 | 8/2015 | Shin et al. |
| RE46,025 | E | 6/2016 | Shimoshikiryo |
| 9,514,698 | B2 | 12/2016 | Song |
| 9,564,095 | B2 | 2/2017 | Irie et al. |
| 9,634,040 | B2 | 4/2017 | Guo et al. |
| 9,715,855 | B2 | 7/2017 | Huang et al. |
| 9,740,068 | B2 | 8/2017 | Ohishi |
| 9,754,547 | B2 | 9/2017 | Shigeta |
| 9,792,867 | B2 | 10/2017 | Ohishi et al. |
| 9,858,868 | B2 | 1/2018 | Kohtoku |
| 9,866,667 | B2 | 1/2018 | Gärdenfors et al. |
| 9,870,740 | B2 | 1/2018 | Park et al. |
| 9,898,078 | B2 | 2/2018 | Peana et al. |
| 10,096,287 | B2 | 10/2018 | Sung et al. |
| 2003/0227429 | A1* | 12/2003 | Shimoshikiryo .......... G02F 1/134336 345/90 |
| 2005/0059488 | A1 | 3/2005 | Larsen et al. |
| 2005/0213015 | A1 | 9/2005 | Shimoshikiryo |
| 2006/0215066 | A1 | 9/2006 | Ueda et al. |
| 2006/0256271 | A1 | 11/2006 | Shimoshikiryo |
| 2007/0132661 | A1 | 6/2007 | Shen et al. |
| 2007/0132895 | A1 | 6/2007 | Shen |
| 2008/0049052 | A1 | 2/2008 | Akiyama |
| 2009/0109015 | A1 | 4/2009 | Ueno |
| 2009/0213053 | A1 | 8/2009 | Naruse et al. |
| 2011/0221760 | A1* | 9/2011 | Irie ...................... G09G 3/3648 345/589 |
| 2011/0234605 | A1 | 9/2011 | Smith et al. |
| 2011/0242149 | A1* | 10/2011 | Yoshida ............... G09G 3/3648 345/690 |
| 2012/0075166 | A1 | 3/2012 | Marti et al. |
| 2012/0229723 | A1 | 9/2012 | Katsuta et al. |
| 2012/0256971 | A1 | 10/2012 | Shin et al. |
| 2012/0306936 | A1 | 12/2012 | Shin et al. |
| 2013/0021240 | A1 | 1/2013 | Coulon |
| 2013/0027439 | A1 | 1/2013 | Kim et al. |
| 2013/0222236 | A1 | 8/2013 | Gärdenfors et al. |
| 2014/0118255 | A1 | 5/2014 | Billerbeck |
| 2014/0191933 | A1 | 7/2014 | Fan et al. |
| 2015/0109268 | A1 | 4/2015 | Huang et al. |
| 2015/0116301 | A1 | 4/2015 | Irie et al. |
| 2015/0316824 | A1 | 11/2015 | Ohishi |
| 2015/0319280 | A1 | 11/2015 | Gärdenfors et al. |
| 2015/0355351 | A1 | 12/2015 | Guo |
| 2015/0379948 | A1 | 12/2015 | Ohishi et al. |
| 2016/0012793 | A1 | 1/2016 | Shigeta |
| 2016/0078819 | A1 | 3/2016 | Park et al. |
| 2016/0104435 | A1 | 4/2016 | Kohtoku |
| 2016/0140907 | A1 | 5/2016 | Kohtoku |
| 2016/0202758 | A1 | 7/2016 | Peana et al. |
| 2016/0225333 | A1 | 8/2016 | Song |
| 2017/0031434 | A1 | 2/2017 | Files et al. |
| 2017/0110059 | A1 | 4/2017 | Sung et al. |
| 2017/0329399 | A1 | 11/2017 | Azam et al. |
| 2018/0096655 | A1 | 4/2018 | Pyeon et al. |
| 2018/0131801 | A1 | 5/2018 | Gärdenfors et al. |
| 2018/0136724 | A1 | 5/2018 | Peana et al. |
| 2018/0188585 | A1 | 7/2018 | Irie et al. |

FOREIGN PATENT DOCUMENTS

| | | |
|---|---|---|
| JP | 2006-276120 A | 10/2006 |
| WO | WO2011065058 A1 | 6/2011 |
| WO | WO2012093630 A1 | 7/2012 |

OTHER PUBLICATIONS

First Office Action mailed for related U.S. Appl. No. 15/737,486 dated Oct. 5, 2018.

Final Office Action for U.S. Appl. No. 15/737,486 dated Jan. 23, 2019, 16 pages.

* cited by examiner

F I G. 2
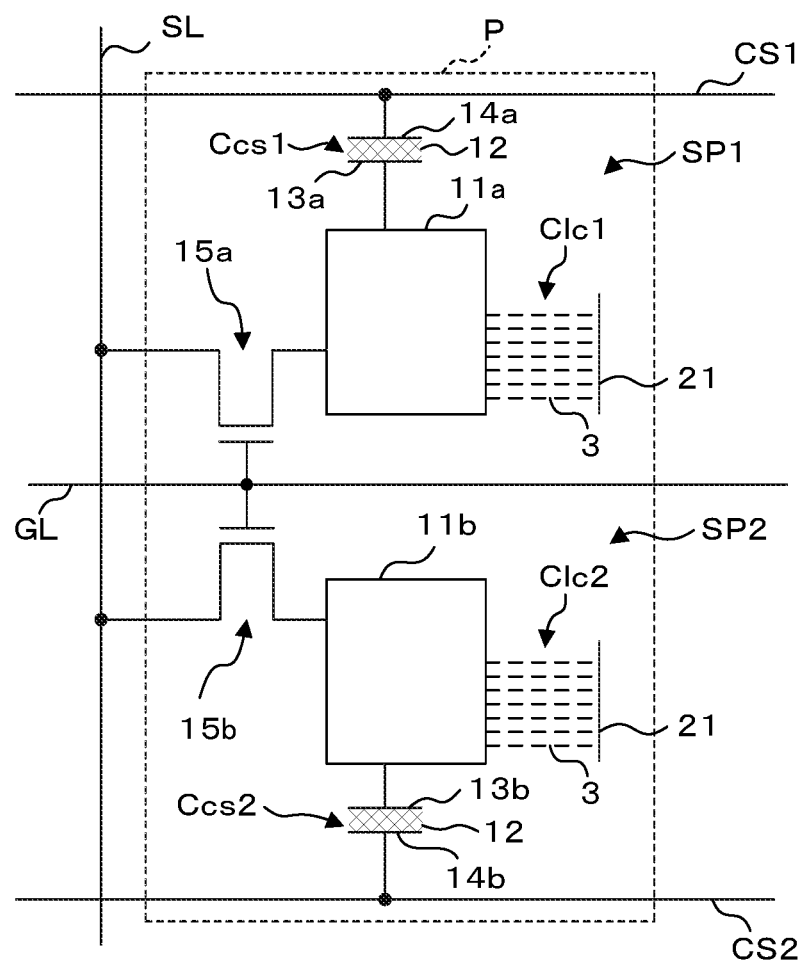

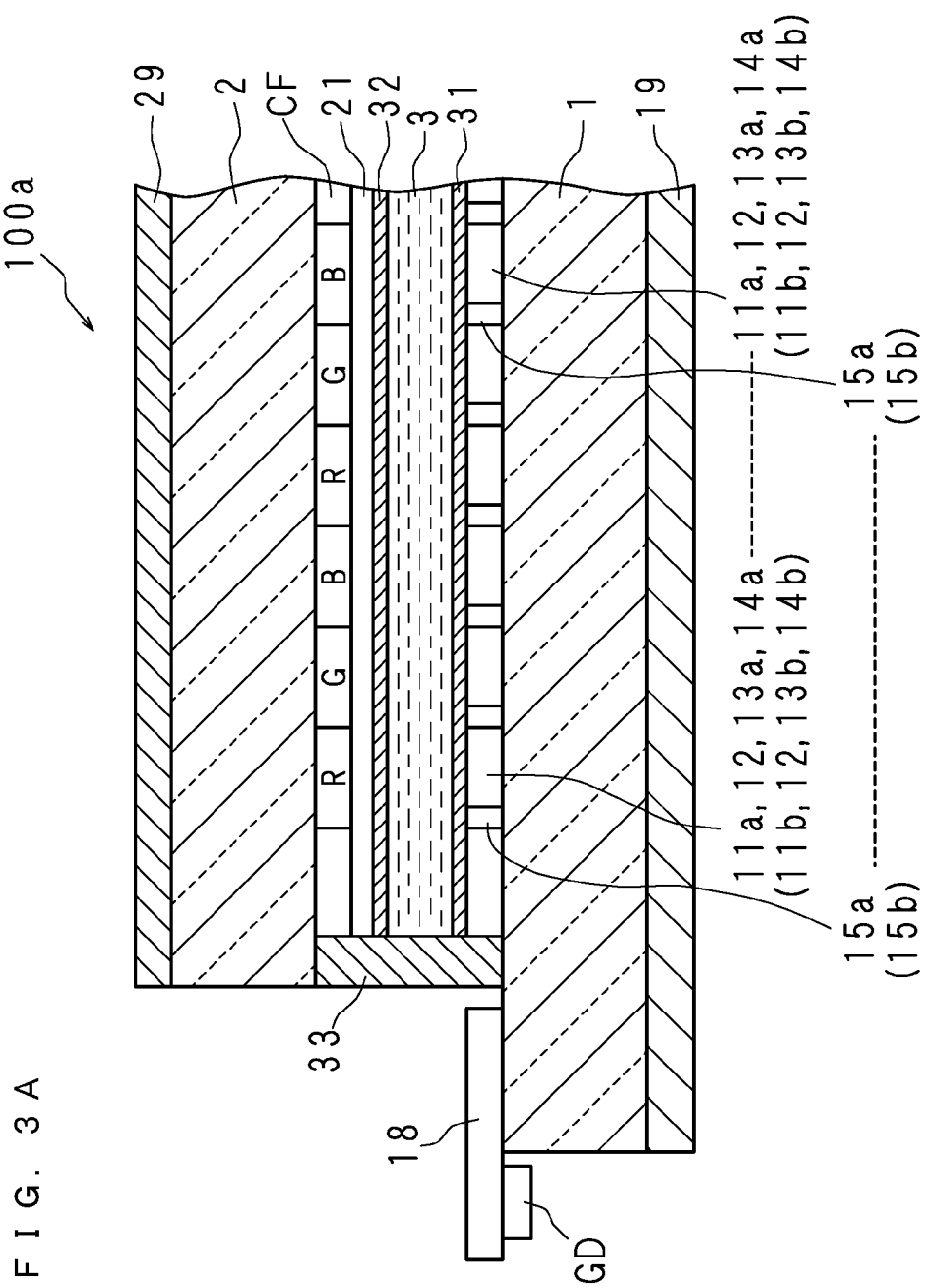

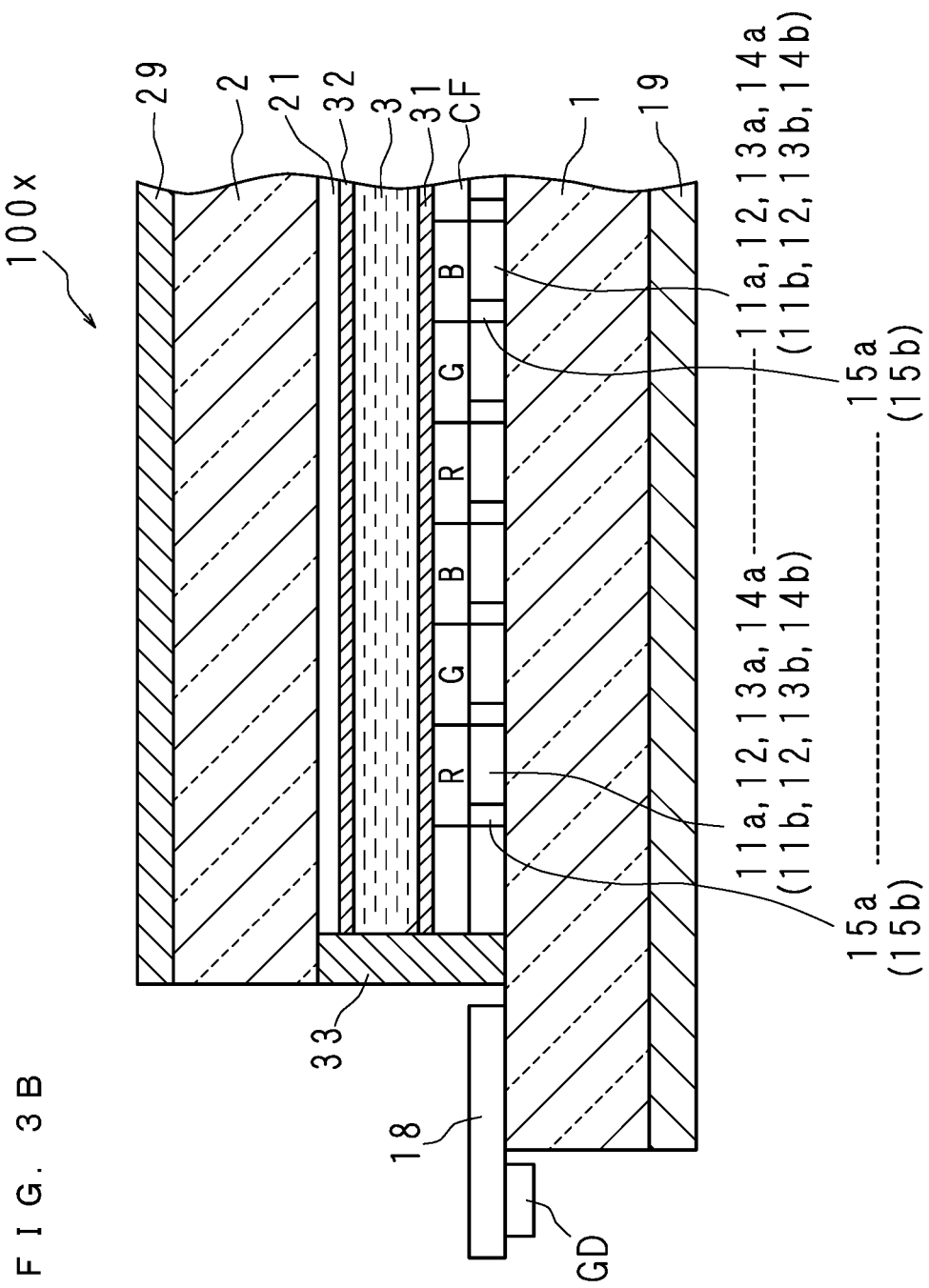

F I G. 9

| RELATIVE POSITION ON DISPLAY SCREEN | AREA | SIGNAL AMPLITUDE [V] |
| --- | --- | --- |
| −1.00 | A | 4.50 |
| −0.75 | B | 2.68 |
| −0.50 | C | 2.14 |
| −0.25 | D | 1.82 |
| 0.00 | E | 1.50 |
| 0.25 | F | 1.82 |
| 0.50 | G | 2.14 |
| 0.75 | H | 2.68 |
| 1.00 | I | 4.50 |

F I G. 1 3
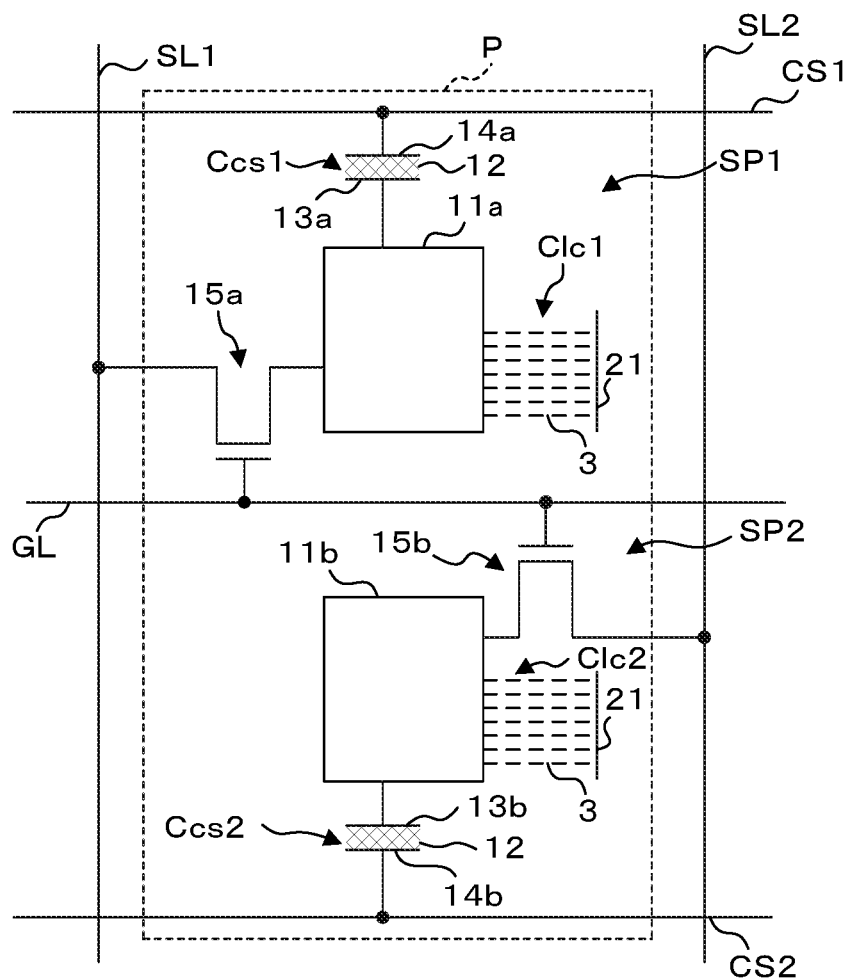

F I G. 1 4
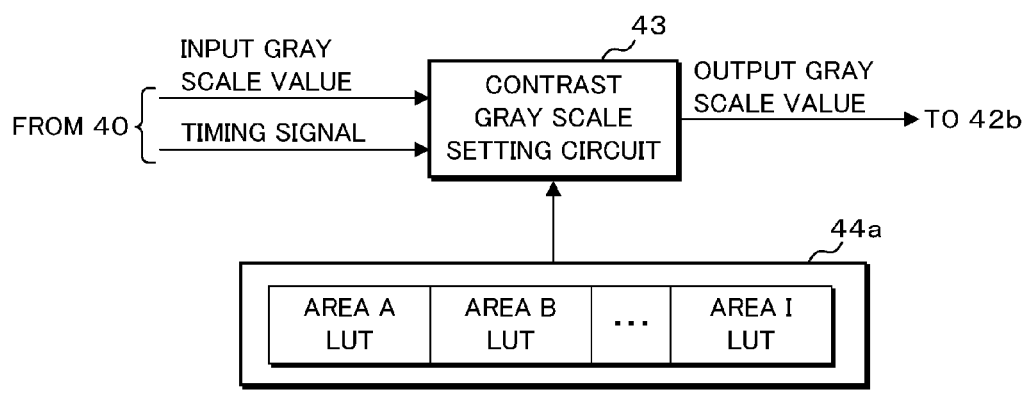

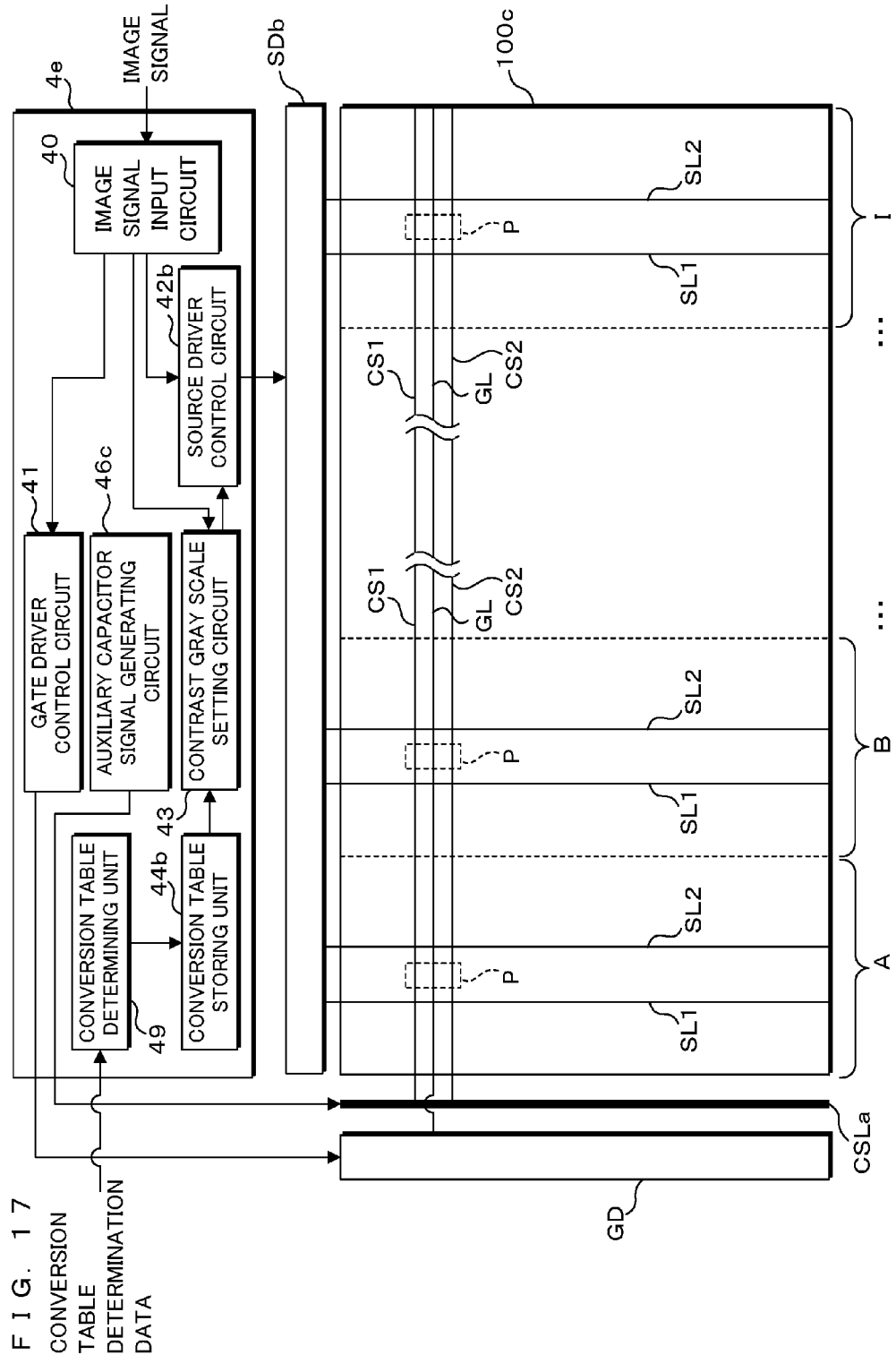

F I G. 1 8
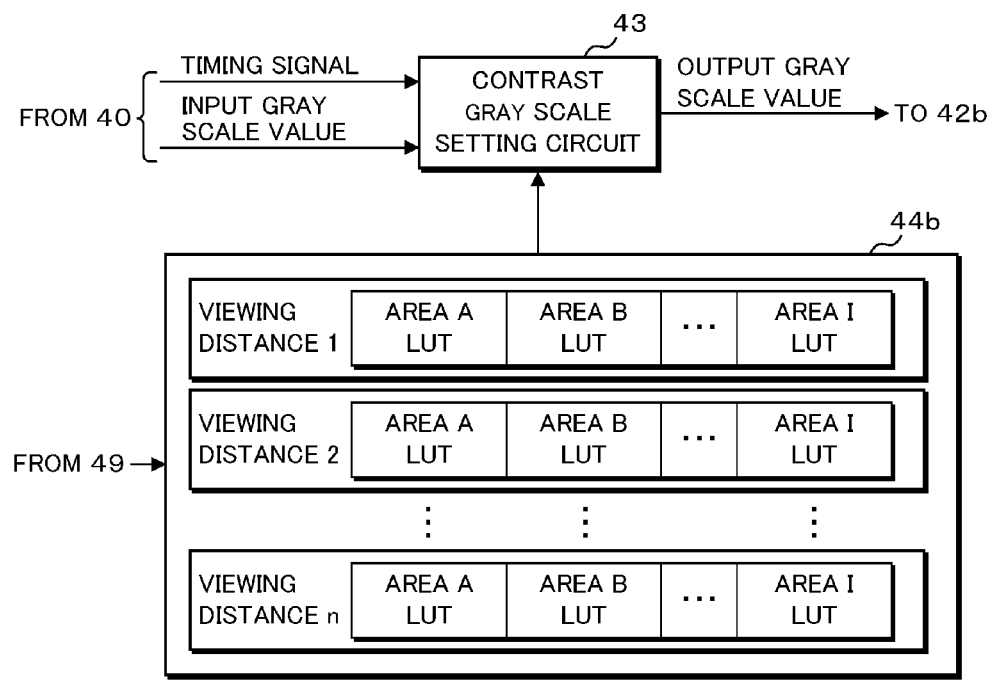

F I G. 1 9
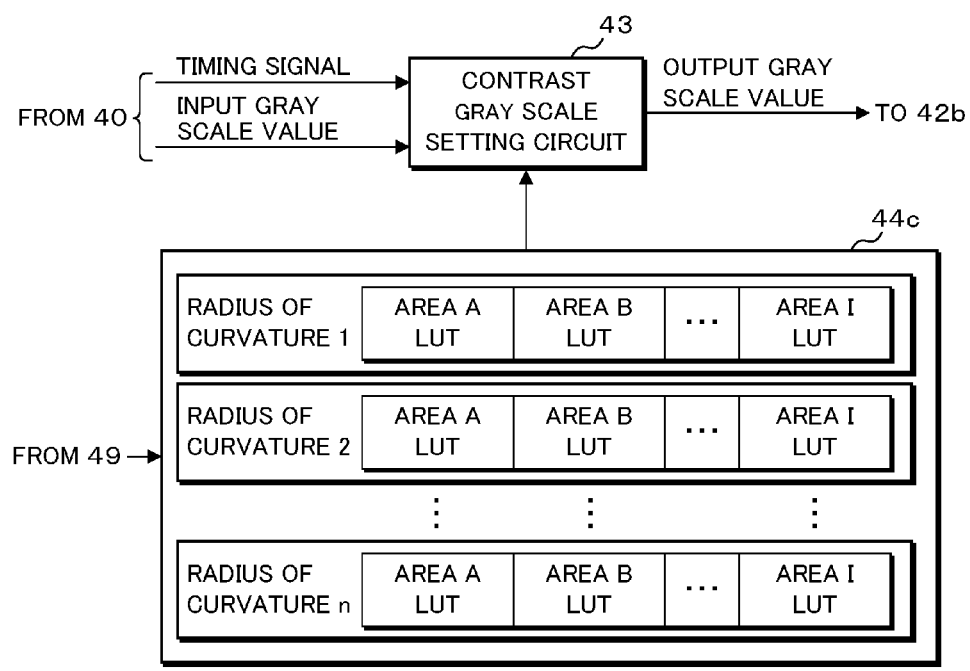

LIQUID CRYSTAL DISPLAY APPARATUS AND METHOD OF DRIVING LIQUID CRYSTAL DISPLAY APPARATUS

CROSS-REFERENCE TO RELATED APPLICATIONS

This application is the national phase under 35 U. S. C. § 371 of PCT International Application No. PCT/JP2014/083608 which has an International filing date of Dec. 18, 2014 and designated the United States of America.

FIELD

The present invention relates to a liquid crystal display apparatus, and more particularly, to a liquid crystal display apparatus and a method of driving a liquid crystal display apparatus that improve a dependency of gamma characteristic on viewing angle.

BACKGROUND

Liquid crystal display apparatuses are flat panel display apparatuses having superior characteristics of high accuracy, a thinness, a light weight, low power consumption, and the like and are widely used for a thin-type television set, a PC monitor, a digital signage, and the like.

Conventionally, a liquid crystal display apparatus of a twisted nematic (TN) mode that is generally used has superior productivity but has a problem in the viewing angle characteristic relating to screen display. For example, in a case where a display screen is seen in a direction inclining with respect to normal line, in a liquid crystal display apparatus of the TN mode, the contrast ratio is markedly lowered, and a luminance difference between gray scales becomes notably unclear. In addition, there are cases where a so-called a gray scale inversion phenomenon is observed in which a portion seen to be bright (or dark) when the display screen is seen on the front side is seen dark (or bright) when the display screen is seen in a direction inclining with respect to the normal line.

As liquid crystal display apparatuses improving the problem of the viewing angle characteristic described above, there are liquid crystal display apparatuses displaying in display modes such as an in-plane switching (IPS) mode and a vertical alignment (VA) mode. A technology for realizing a display mode in such liquid crystal display apparatuses is widely used as a technology for improving the viewing angle characteristic.

However, as one of problems of the viewing angle characteristic, there is a problem (hereinafter, referred to as viewing angle dependency of gamma characteristic) in that the gamma characteristic representing the dependency of display luminance on the gray scale depends on the angle of the sight line with respect to the normal line of the display screen. This problem is that the gray scale display state is different according to the observation direction for the display screen, and the gamma characteristic is observed to be different between a case where the observation direction is a direction along the normal line of the display screen and a case where the observation direction is a direction inclining with respect to the normal line.

For this, in Japanese Patent Application Laid-Open No. 2004-62146, a liquid crystal display apparatus improving the viewing angle dependency of gamma characteristic (in Japanese Patent Application Laid-Open No. 2004-62146, called as a viewing-field angle dependency of gamma characteristic) is disclosed. In the liquid crystal display apparatus described in Japanese Patent Application Laid-Open No. 2004-62146, each pixel is configured by a plurality of sub-pixels, and an auxiliary capacitor (CS) is disposed in each sub-pixel. The auxiliary capacitor is formed by an auxiliary capacitor electrode electrically connected to the electrode of each sub-pixel, an insulating layer, and an auxiliary capacitor opposing electrode facing the auxiliary capacitor electrode through the insulating layer.

In the liquid crystal display apparatus described in Japanese Patent Application Laid-Open No. 2004-62146, for a plurality of sub pixels configuring each pixel, each auxiliary capacitor opposing electrode is electrically independent, and oscillation voltages (auxiliary capacitor opposing voltages) having different phases are applied to the auxiliary capacitor opposing electrodes.

In this way, by configuring the auxiliary capacitor opposing voltage to be different for each auxiliary capacitor opposing electrode, effective voltages applied to the liquid crystal layer of the plurality of sub pixels can be changed. In such a case, since each pixel is observed in a state in which a gamma characteristic different for each sub pixel is balanced, the viewing angle dependency of gamma characteristic is improved.

SUMMARY

However, according to the technology described in Japanese Patent Application Laid-Open No. 2004-62146, in a case where the display screen is observed in a direction intersecting with a normal line, compared to a case where the display screen is observed in a direction along the normal line on the front side, the degradation of gamma characteristic is suppressed without considering a difference in a tolerance angle. For this reason, for example, in a case where the display screen is observed in a situation in which an angle formed by the normal line and the sight line of an observer in an edge portion of the display screen is relatively large, there is a problem in that the suppression of the degradation of gamma characteristic becomes more insufficient as the observation target position on the display screen is closer to the end portion.

The present invention is formed in consideration of such situations, and an object thereof is to provide a liquid crystal display apparatus and a method of driving a liquid crystal display apparatus capable of effectively suppressing the degradation of gamma characteristic also in a case where an angle formed by a normal line at an observation target position on the display screen and the sight line of an observer is relatively large.

According to one embodiment of the present invention, there is provided a liquid crystal display apparatus in which a liquid crystal layer and a plurality of electrode pairs used for applying voltages to the liquid crystal layer are included, pixels partitioned to include the electrode pairs are arranged in a matrix pattern, a plurality of sub pixels partitioned to include at least one of the electrode pairs are included in each of the pixels, and a voltage difference between voltages applied to the liquid crystal layer by the electrode pairs partitioning at least two sub pixels among the plurality of sub pixels is different according to an arrangement position of the pixel in a row direction and/or a column direction of the matrix.

According to one embodiment of the present invention, there is provided a liquid crystal display apparatus in which a liquid crystal layer and a plurality of electrode pairs used for applying voltages to the liquid crystal layer are included, pixels partitioned to include the electrode pairs are arranged in a matrix pattern, a plurality of sub pixels partitioned to include at least one of the electrode pairs are included in each of the pixels, and a brightness difference or a luminance difference between at least two sub pixels among the plurality of sub pixels is different according to an arrangement position of the pixel in a row direction and/or a column direction of the matrix.

In the liquid crystal display apparatus according to the embodiment of the present invention, it is preferred that the voltage difference or the brightness difference or the luminance difference increases as the arrangement position of the pixel is further separate from a center portion in a row direction and/or a column direction of the matrix.

In the liquid crystal display apparatus according to the embodiment of the present invention, it is preferred that a liquid crystal panel which has the liquid crystal layer and the electrode pairs and of which a display screen is curved toward a front side is further included, and that the voltage difference or the brightness difference or the luminance difference is different according to curvature of the display screen of the liquid crystal panel.

In the liquid crystal display apparatus according to the embodiment of the present invention, it is preferred that the voltage difference or the brightness difference or the luminance difference is different according to a distance from the center portion of the display screen of the liquid crystal panel to a position separate in a direction of a normal line on the front side of the display screen.

In the liquid crystal display apparatus according to the embodiment of the present invention, it is preferred that the display screen of the liquid crystal panel is curved to be convex toward the front side, and that the voltage difference or the brightness difference or the luminance difference is larger as the curvature is larger or as the distance is shorter.

In the liquid crystal display apparatus according to the embodiment of the present invention, it is preferred that each of the at least two sub pixels is partitioned to include an electrode pair of a sub pixel electrode and an opposing electrode facing each other through the liquid crystal layer, and that a switching element disposed with respect to each of the at least two sub pixels and at least two data signal lines used for applying data signals to the sub pixel electrodes through the switching elements are further included.

In the liquid crystal display apparatus according to the embodiment of the present invention, it is preferred that the liquid crystal display apparatus includes a reception unit that receives image data; a storage unit that stores, for each of divisions acquired by dividing arrangement positions of the pixels into a plurality of parts, a correspondence relation between a gray scale value and a plurality of the gray scale values having mutually-different magnitudes; an image signal converting unit that converts a gray scale value based on the image data received by the reception unit into a plurality of gray scale values having mutually-different magnitudes based on a division to which the arrangement position of the pixel belongs and a stored content of the storage unit; and a data signal line driving circuit that applies data signals according to the plurality of gray scale values converted by the image signal converting unit to the at least two data signal lines.

In the liquid crystal display apparatus according to the embodiment of the present invention, it is preferred that each of the at least two sub pixels is partitioned to include an electrode pair of a sub pixel electrode and an opposing electrode facing each other through the liquid crystal layer, an insulating layer, and an electrode pair of an auxiliary capacitor electrode and an auxiliary capacitor opposing electrode facing each other through the insulating layer, that the sub pixel electrode and the auxiliary capacitor electrode are electrically connected, and that at least two auxiliary capacitor signal lines used for applying voltage signals to the auxiliary capacitor opposing electrode are further included.

In the liquid crystal display apparatus according to the embodiment of the present invention, it is preferred that a ratio of the magnitude of an auxiliary capacitor to a sum of the magnitude of a liquid crystal capacitor formed by the sub pixel electrode and the opposing electrode and the magnitude of the auxiliary capacitor formed by the auxiliary capacitor electrode and the auxiliary capacitor opposing electrode is different according to the arrangement position of the pixel.

In the liquid crystal display apparatus according to the embodiment of the present invention, it is preferred that the magnitude of the auxiliary capacitor is different according to the arrangement position of the pixel.

In the liquid crystal display apparatus according to the embodiment of the present invention, it is preferred that an auxiliary capacitor signal line driving circuit that applies voltage signals to the auxiliary capacitor signal lines is further included, and that the voltage signals applied to specific two auxiliary capacitor signal lines by the auxiliary capacitor signal line driving circuit have opposite polarities and have amplitudes different according to the arrangement position of the pixel.

According to one embodiment of the present invention, there is provided a method of driving a liquid crystal display apparatus in which a liquid crystal layer and a plurality of electrode pairs used for applying voltages to the liquid crystal layer are included, pixels partitioned to include the electrode pairs are arranged in a matrix pattern, and a plurality of sub pixels partitioned to include one or two electrode pairs are included in each of the pixels, wherein a voltage difference between voltages applied to the liquid crystal layer by the electrode pairs partitioning at least two sub pixels among the plurality of sub pixels is different according to an arrangement position of the pixel in a row direction and/or a column direction of a matrix.

According to one embodiment of the present invention, there is provided a method of driving a liquid crystal display apparatus in which a liquid crystal layer and a plurality of electrode pairs used for applying voltages to the liquid crystal layer are included, pixels partitioned including the electrode pairs are arranged in a matrix pattern, and a plurality of sub pixels partitioned to include one or two electrode pairs are included in each of the pixels, wherein a brightness difference or a luminance difference between at least two sub pixels among the plurality of sub pixels is different according to an arrangement position of the pixel in a row direction and/or a column direction of the matrix.

According to one embodiment of the present invention, pixels arranged in a matrix pattern are partitioned to include the electrode pairs used for applying voltages to the liquid crystal layer, and each of a plurality of sub pixels included in each of the pixels is partitioned to include at least one electrode pair. In at least two sub pixels included in the pixel, a voltage difference between voltages applied to the liquid crystal layer by the electrode pairs is different according to an arrangement position of the pixel in a row direction and/or a column direction of the matrix.

Accordingly, a voltage difference between voltages applied to the liquid crystal layer by two or more sub pixels included in a pixel is changed according to the arrangement position of the pixel in the matrix, and accordingly, the improvement factor of the viewing angle dependency of gamma characteristic is changed according to an observation target position on the display screen viewed from an observer.

According to one embodiment of the present invention, pixels arranged in a matrix pattern are partitioned to include the electrode pairs used for applying voltages to the liquid crystal layer, and each of a plurality of sub pixels included in each of the pixels is partitioned to include at least one electrode pair. Then, a brightness difference or a luminance difference between at least two sub pixels included in the pixel is different according to an arrangement position of the pixel in a row direction and/or a column direction of the matrix.

Accordingly, a brightness difference or a luminance difference between two or more sub pixels included in a pixel is changed according to the arrangement position of the pixel in the matrix, and accordingly, the improvement factor of the viewing angle dependency of gamma characteristic is changed according to an observation target position on the display screen viewed from an observer.

According to the present invention, as the arrangement position of the pixel is further separate from a center portion in a row direction and/or a column direction of the matrix, a voltage difference between the voltages applied to the liquid crystal layer by at least two sub pixels or a brightness difference or a luminance difference between the at least two sub pixels increases.

Accordingly, in a case where an observer observes a display screen from the front side of a center portion of the display screen, as an observation target position on the display screen viewed from the observer is further separate from the center portion of the screen in a row direction and/or a column direction, the improvement factor of the viewing angle dependency of gamma characteristic is improved.

According to the preferred embodiment of the present invention, according to curvature of the display screen of the liquid crystal panel, a voltage difference between voltages applied to the liquid crystal layer in accordance with at least two sub pixels or a brightness difference or a luminance difference between the at least two sub pixels is different.

Accordingly, in order to compensate for a change in the degree of influence of the viewing angle dependency of gamma characteristic according to the curvature of the display screen, the improvement factor of the viewing angle dependency of gamma characteristic is changed.

According to the preferred embodiment of the present invention, in accordance with a distance from the center portion of the display screen of the liquid crystal panel to a position that is separate in the direction of a normal line on the front side of the display screen, a voltage difference between voltages applied to the liquid crystal layer in accordance with at least two sub pixels or a brightness difference or a luminance difference between the at least two sub pixels is different.

Accordingly, in order to compensate for a change in the degree of influence of the viewing angle dependency of gamma characteristic according to the viewing distance for the display screen, the improvement factor of the viewing angle dependency of gamma characteristic is changed.

According to the preferred embodiment of the present invention, as the curvature of the display screen of the liquid crystal panel curved to be convex toward the front side is larger, or as the viewing distance is shorter, a voltage difference between voltages applied to the liquid crystal layer in accordance with at least two sub pixels or a brightness difference or a luminance difference between the at least two sub pixels is larger.

Accordingly, in order to compensate for a change in the degree of influence of the viewing angle dependency of gamma characteristic to "large/small" according to "large/small" of the curvature of the display screen or "short/long" of the viewing distance for the display screen, the improvement factor of the viewing angle dependency of gamma characteristic is changed to "large/small".

According to the preferred embodiment of the present invention, in the electrode pair partitioning at least two sub pixels included in a pixel, the sub pixel electrode and the opposing electrode facing each other through the liquid crystal layer are included. Then, data signals are applied to the sub pixel electrodes from at least two data signal lines through switching elements.

Accordingly, voltages having mutually-different magnitudes are applied to the liquid crystal layer by using the two or more sub pixels included in the pixel.

According to the preferred embodiment of the present invention, for each of divisions acquired by dividing arrangement positions of the pixels into a plurality of parts in the row direction and/or the column direction of the matrix, a correspondence relation between a gray scale value relating to image data and a plurality of the gray scale values having mutually-different magnitudes is stored in the storage unit in advance. Then, the image signal converting unit converts a gray scale value based on the image data received by the reception unit into a plurality of gray scale values having mutually-different magnitudes based on a division to which the arrangement position of the conversion target pixel belongs and a stored content of the storage unit, and the data signal line driving circuit applies data signals according to the plurality of converted gray scale values to the at least two data signal lines.

Accordingly, a voltage difference between voltages applied to the liquid crystal layer by at least two or more sub pixels included in a pixel is changed according to a division position of the pixel in the matrix.

According to the preferred embodiment of the present invention, in the electrode pair partitioning at least two sub pixels included in a pixel, the sub pixel electrode and the opposing electrode facing each other through the liquid crystal layer and the auxiliary capacitor electrode and the auxiliary capacitor opposing electrode facing each other through the insulating layer are included, and, among these, the auxiliary capacitor electrode is electrically connected to the sub pixel electrode. Then, a voltage signal is applied to each auxiliary capacitor opposing electrode from at least one of the at least two auxiliary capacitor signal lines.

Accordingly, in a case where mutually-different voltage signals are applied to the auxiliary capacitor opposing electrodes of two or more sub pixels included in a pixel, mutually-different voltages are applied between the sub pixel electrodes connected to the auxiliary capacitor electrodes facing the auxiliary capacitor opposing electrodes and the opposing electrodes.

According to the preferred embodiment of the present invention, for at least two sub pixels included in a pixel, in a case where the magnitude of the liquid crystal capacitor formed by the sub pixel electrode and the opposing electrode, for example, is assumed to be CLC, and the magnitude of the auxiliary capacitor formed by the auxiliary capacitor electrode and the auxiliary capacitor opposing electrode, for example, is assumed to be CCS, a ratio of a change in the voltage applied to the liquid crystal capacitor to a change in the voltage of the voltage signal applied to the auxiliary capacitor opposing electrode corresponds to K=CCS/(CCS+CLC) that is a divided-voltage ratio according to capacitors connected in series. Here, the magnitude of K is configured to be different according to the arrangement position of the pixel in the row direction and/or the column direction of the matrix.

Accordingly, a voltage difference between voltages applied to the liquid crystal layer by two or more sub pixels included in a pixel is changed according to the arrangement position of the pixel in the matrix.

According to the preferred embodiment of the present invention, in the at least two sub pixels included in a pixel P, the magnitude of CCS described above is configured to be different according to the arrangement position of the pixel P in the row direction and/or the column direction of the matrix, and the value of K is configured to be changed according thereto.

Accordingly, a voltage difference between voltages applied to the liquid crystal layer by two or more sub pixels included in a pixel is changed according to the arrangement position of the pixel in the matrix.

According to the preferred embodiment of the present invention, signals having the amplitudes different according to the arrangement position of the pixel in the row direction and/or the column direction of the matrix and having opposite polarities are applied to specific two auxiliary capacitor signal lines among the at least two auxiliary capacitor signal lines by the auxiliary capacitor signal line driving circuit.

Accordingly, a voltage difference between voltages applied to the liquid crystal layer by two or more sub pixels included in a pixel is changed according to the arrangement position of the pixel in the matrix.

According to one embodiment of the present invention, a voltage difference between voltages applied to the liquid crystal layer by two or more sub pixels included in a pixel is changed according to the arrangement position of the pixel in the matrix, and accordingly, the improvement factor of the viewing angle dependency of gamma characteristic is changed according to an observation target position on the display screen viewed from an observer.

Accordingly, by offsetting the tendency of degradation of gamma characteristic according to a change in the observation target position and the tendency of improvement on the viewing angle dependency, the degradation of gamma characteristic can be effectively suppressed also in a case where an angle formed by a normal line at the observation target position on the display screen and the sight line of an observer is relatively large.

The above and further objects and features will more fully be apparent from the following detailed description with accompanying drawings.

BRIEF DESCRIPTION OF THE DRAWINGS

FIG. 2 is an explanatory diagram that schematically illustrates a configuration partitioning a pixel in a liquid crystal panel according to Embodiment 1 of the present invention.

FIG. 3A is a cross-sectional view that schematically illustrates the configuration of a liquid crystal panel.

FIG. 3B is a cross-sectional view that schematically illustrates the configuration of a liquid crystal panel.

FIG. 9 is a table that illustrates a relation between a position on a display screen and the amplitudes of signals applied to auxiliary capacitor signal lines.

FIG. 13 is an explanatory diagram that schematically illustrates a configuration partitioning a pixel in a liquid crystal panel according to Embodiment 3 of the present invention.

FIG. 14 is an explanatory diagram that is used for describing a conversion of a gray scale using a contrast gray scale setting circuit.

FIG. 17 is a block diagram that illustrates an example of the configuration of a liquid crystal display apparatus according to Embodiment 5 of the present invention.

FIG. 18 is an explanatory diagram that illustrates an example of the stored content of a conversion table storing unit.

FIG. 19 is an explanatory diagram that illustrates an example of the stored content of another conversion table storing unit.

DETAILED DESCRIPTION

Figure 1:
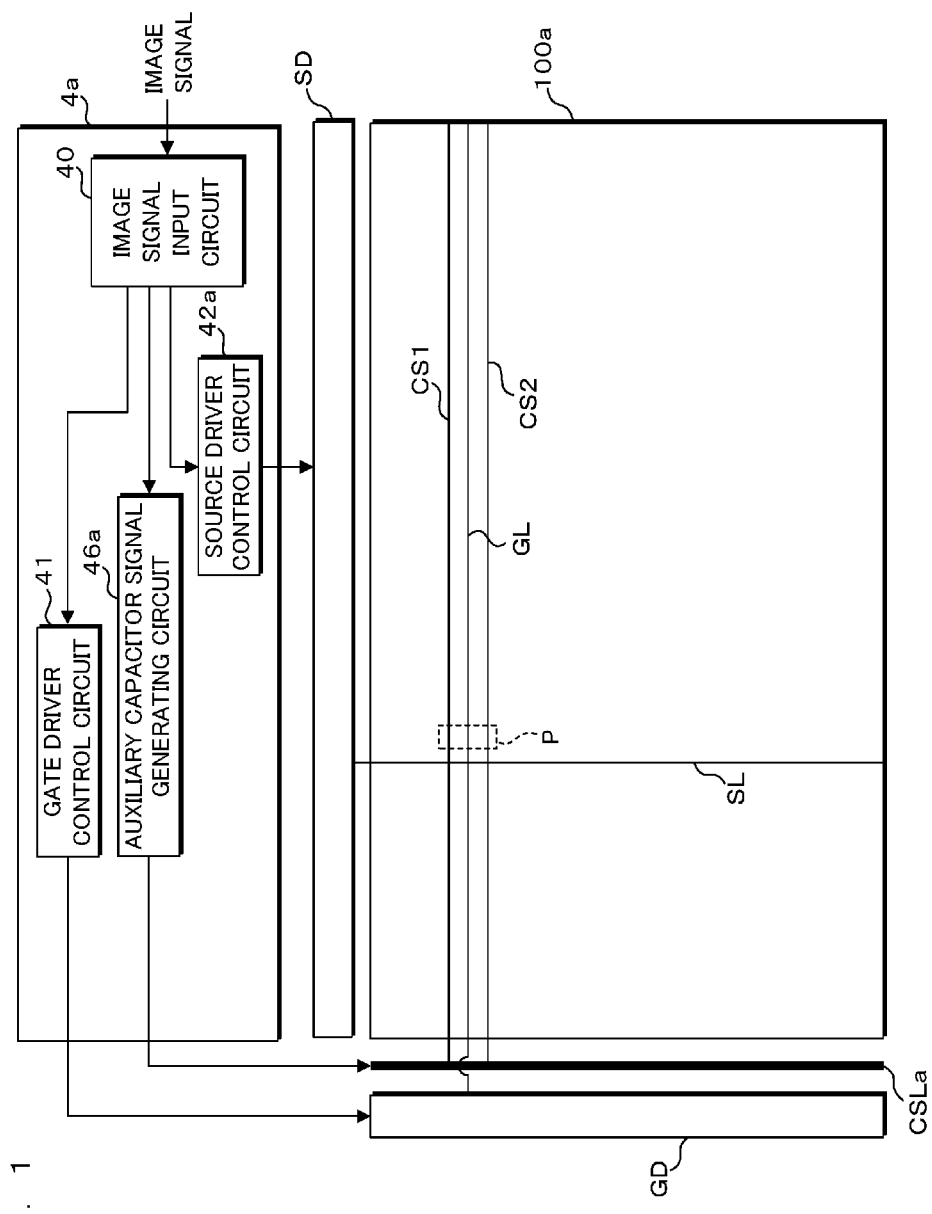
FIG. 1 is a block diagram that illustrates an example of the configuration of a liquid crystal display apparatus according to Embodiment 1 of the present invention.

Hereinafter, the present invention will be described in detail with reference to drawings representing the embodiments thereof.
(Embodiment 1)
FIG. 1 is a block diagram that illustrates an example of the configuration of a liquid crystal display apparatus according to Embodiment 1 of the present invention, and FIG. 2 is an explanatory diagram that schematically illustrates a configuration partitioning a pixel P in a liquid crystal panel 100a according to Embodiment 1 of the present invention. The liquid crystal display apparatus illustrated in FIG. 1 includes the liquid crystal panel 100a in which pixels P partitioned to include a plurality of electrode pairs to be described later are arranged in a matrix pattern in the vertical direction and the horizontal direction of a display screen. In the liquid crystal panel 100a, the display screen is curved to be convex toward the front side. For the liquid crystal panel 100a, representative one pixel P and signal lines relating to the pixel P will be focused in the illustration.

In the configuration illustrated in FIG. 2, the pixel P is formed to include sub pixels SP1 and SP2 that are two parts divided in the vertical direction of the display screen of the liquid crystal panel 100a (hereinafter, simply referred to as the vertical direction; this similarly applies to the horizontal direction). The sub pixel SP1 is partitioned by an electrode pair of a sub pixel electrode 11a and an opposing electrode 21 facing each other through a liquid crystal layer 3 and an electrode pair of an auxiliary capacitor electrode 13a and an auxiliary capacitor opposing electrode 14a facing each other through an insulating layer 12. One terminal of a thin film transistor (TFT; corresponding to a switching element) 15a is connected to the sub pixel electrode 11a. The sub pixel electrode 11a and the auxiliary capacitor electrode 13a are electrically connected to each other. A liquid crystal capacitor Clc1 is formed by the sub pixel electrode 11a and the opposing electrode 21. In addition, an auxiliary capacitor Ccs1 is formed by the auxiliary capacitor electrode 13a and the auxiliary capacitor opposing electrode 14a.

Similarly, the sub pixel SP2 is partitioned by an electrode pair of a sub pixel electrode 11b and an opposing electrode 21 facing each other through the liquid crystal layer 3 and an electrode pair of an auxiliary capacitor electrode 13b and an auxiliary capacitor opposing electrode 14b facing each other through the insulating layer 12. One terminal of a TFT 15b is connected to the sub pixel electrode 11b. The sub pixel electrode 11b and the auxiliary capacitor electrode 13b are electrically connected to each other. While the opposing electrode 21 is configured to be common to the sub pixels SP1 and SP2, the configuration is not limited thereto. A liquid crystal capacitor Clc2 is formed by the sub pixel electrode 11b and the opposing electrode 21. In addition, an auxiliary capacitor Ccs2 is formed by the auxiliary capacitor electrode 13b and the auxiliary capacitor opposing electrode 14b.

On one lateral side of the pixel P in the horizontal direction, a source signal line (corresponding to a data signal line) SL used for applying a source signal (corresponding to a data signal) to the sub pixel electrodes 11a and 11b respectively through the TFTs 15a and 15b is linearly arranged in the vertical direction. The other ends of the TFTs 15a and 15b are connected to the source signal line SL. The auxiliary capacitor opposing electrodes 14a and 14b are respectively connected to auxiliary capacitor signal lines CS1 and CS2, which are arranged to linearly traverse both end portions of the pixel P in the vertical direction, in the horizontal direction. Gate electrodes of the TFTs 15a and 15b are connected to a scan signal line GL that is linearly arranged to traverse a center portion of the pixel P in the horizontal direction.

Referring back to FIG. 1, the liquid crystal display apparatus according to Embodiment 1 further includes: a gate driver GD that applies a scan signal to scan signal lines GL, GL, . . . , GL; a source driver (corresponding to a data signal line driving circuit) SD that applies a source signal to source signal lines SL, SL, . . . , SL; an inter-auxiliary capacitor signal wiring CSLa that is used for applying a voltage signal to auxiliary capacitor signal line CS1, CS2, CS1, CS2, . . . , CS1, CS2; and a display control circuit 4a that controls display using the liquid crystal panel 100a by using the gate driver GD, the source driver SD, and the inter-auxiliary capacitor signal wiring CSLa.

The display control circuit 4a includes: an image signal input circuit (corresponding to a reception unit) 40 that receives an image signal including image data representing an image; and a gate driver control circuit 41 and a source driver control circuit 42a that respectively control the gate driver GD and the source driver SD based on a clock signal and a synchronization signal separated by the image signal input circuit 40. In addition, the display control circuit 4a includes an auxiliary capacitor signal generating circuit (corresponding to an auxiliary capacitor signal line driving circuit) 46a that generates voltage signals applied to the auxiliary capacitor signal lines CS1 and CS2 based on a timing signal transmitted from the image signal input circuit 40. The auxiliary capacitor signal generating circuit 46a is configured to drive the auxiliary capacitor signal lines CS1 and CS2 through the inter-auxiliary capacitor signal wiring CSLa.

The gate driver control circuit 41 and the source driver control circuit 42a generate control signals such as a start signal, a clock signal, and an enable signal that are necessary for periodical operations of the gate driver GD and the source driver SD. In addition, the source driver control circuit 42a generates analog image data based on digital image data separated by the image signal input circuit 40 and supplies the generated analog image data to the source driver SD.

The gate driver GD, within one vertical scan period of image data, sequentially applies a scan signal to the scan signal lines GL, GL, . . . , GL with a predetermined time difference. The source driver SD applies source signals (parallel data) representing an image corresponding to one line that is generated by accumulating the analog image data (serial data) supplied from the source driver control circuit 42a for one horizontal scan period to the source signal lines SL, SL, . . . , SL in a parallel manner. Here, the source signals corresponding to one line are updated with the predetermined time difference.

The source signals applied to the source signal lines SL, SL, . . . , SL, in one horizontal scan period in which the scan signal is applied to one scan signal line GL, are applied to the sub pixel electrodes 11a and 11b through the TFTs 15a and 15b of which the gates are connected to the one scan signal line GL and are also applied to the auxiliary capacitor electrodes 13a and 13b. Accordingly, the source signals are written into the liquid crystal capacitors Clc1 and Clc2 and the auxiliary capacitors Ccs1 and Ccs2 respectively formed in the sub pixels SP1 and SP2. In this way, the source signals corresponding to one line are simultaneously written into the pixels P, P, . . . P corresponding to one line in one horizontal scan period. The written source signals are maintained only for one vertical scan period.

Next, the optical configurations of the liquid crystal panel 100a and another liquid crystal panel acquired through a substitution therein will be described.

FIG. 3A is a cross-sectional view that schematically illustrates the configuration of the liquid crystal panel 100a, and FIG. 3B is a cross-sectional view that schematically illustrates the configuration of a liquid crystal panel 100x. In the liquid crystal panel 100a and the liquid crystal panel 100x, only a part of the configuration is different, and thus, most of description will be presented to be common. Each of the liquid crystal panels 100a and 100x is configured such that a liquid crystal layer 3 is interposed between a first glass substrate (array substrate) 1 and a second glass substrate 2. Between surfaces of the first glass substrate 1 and the second glass substrate 2 facing each other, a sealing member 33 used for sealing liquid crystal enclosed by the liquid crystal layer 3 is disposed along the peripheral edge portion of the second glass substrate 2.

On one surface of the first glass substrate 1, an alignment film 31 is formed on a layer including sub pixel electrodes 11a and 11b, which are formed from transparent electrodes, auxiliary capacitor electrodes 13a and 13b, auxiliary capacitor opposing electrodes 14a and 14b, an insulating layer 12, and TFTs 15a and 15b. Particularly, in the liquid crystal panel 100x, between the alignment film 31 and the layer in which the TFTs 15a and 15b and the like are included, color filers CF of three colors R, G, and B corresponding to each pixel P are formed. In addition, a polarizing plate 19 is attached to the other surface of the first glass substrate 1. A flexible substrate 18 having a surface on which the gate driver GD is mounted is attached to an edge portion of one surface of the first glass substrate 1.

On one surface of the second glass substrate 2, an opposing electrode 21 formed from a transparent electrode and an alignment film 32 are formed to be stacked. Particularly, in the liquid crystal panel 100a, between the second glass substrate 2 and the opposing electrode 21, color filers CF are formed. In addition, a polarizing plate 29 is attached to the other surface of the second glass substrate 2. The polarizing plate 19 and the polarizing plate 29 have polarizing directions (polarizing faces) of light passing therethrough to be different by 90 degrees. A backlight (not illustrated) is disposed on the other surface side (the side to which the polarizing plate 19 is attached) of the first glass substrate 1.

In the liquid crystal panels 100a and 100x, substantially, only the position of the color filters CF is different. By arranging the color filter CF on the first glass substrate 1 side, there is an effect of preventing a color shift in a case where the display screen is curved.

In the configuration described above, in a case where a voltage is not applied between each of the sub pixel electrodes 11a and 11b of the pixel P and the opposing electrode 21, the polarization direction of light transmitting through the pixel P is not changed, and accordingly, light that is emitted from the backlight and passes through the polarizing plate 19 is absorbed in the polarizing plate 29. In contrast to this, in a case where a voltage is applied between each of the sub pixel electrodes 11a and 11b of the pixel P and the opposing electrode 21, the polarization direction of light transmitting through the pixel P is changed according to the magnitude of the voltage, and accordingly, the polarization direction of light that is emitted from the backlight and passes through the polarizing plate 19 is changed according to the magnitude of the voltage, and the light passes through the polarizing plate 29. In this way, the brightness of an image displayed by the pixels P is changed.

Next, a relation between a voltage signal applied to the auxiliary capacitor signal lines CS1 and CS2 and a voltage applied to the liquid crystal capacitors Clc1 and Clc2 will be described.

Figure 4:
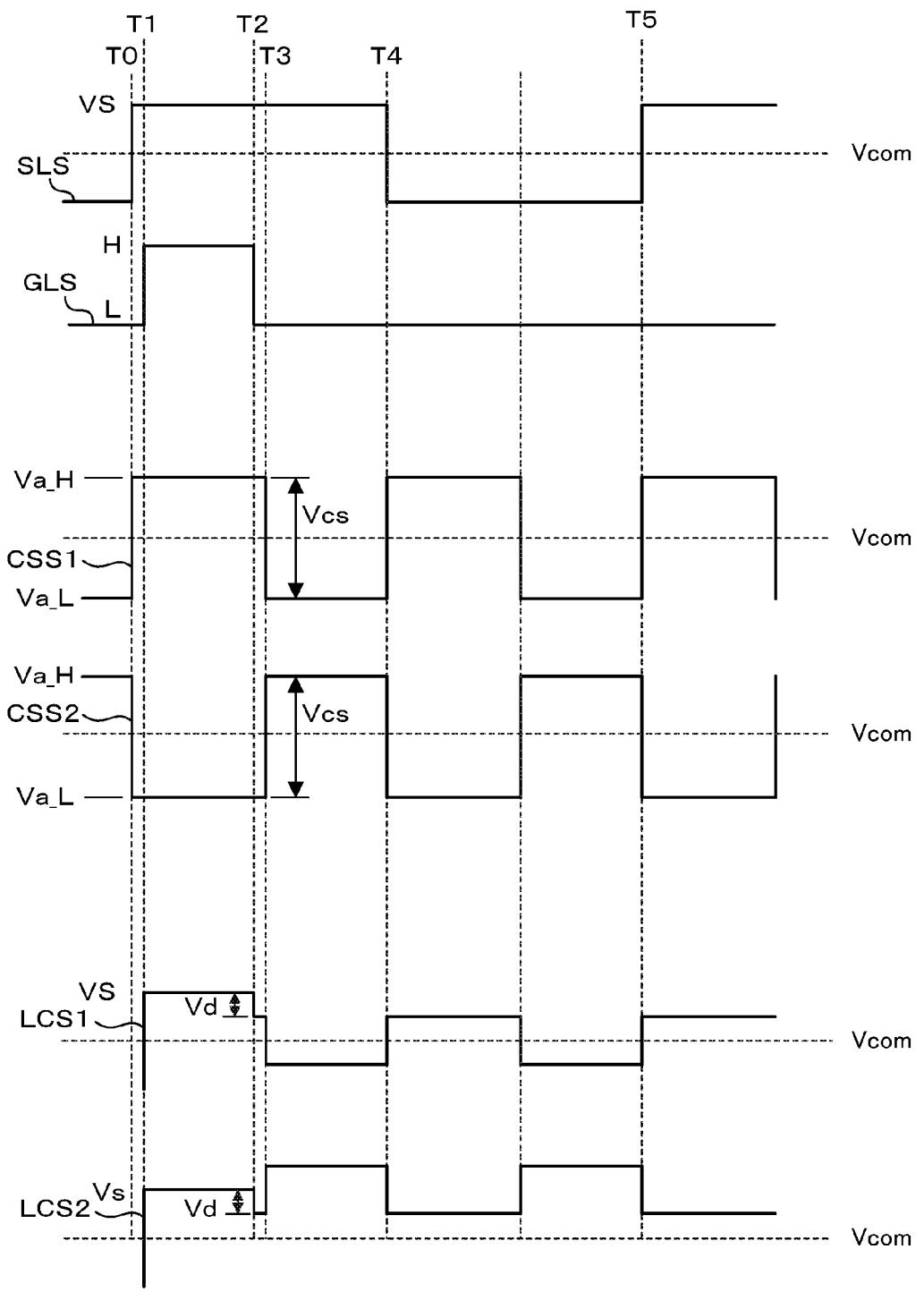
FIG. 4 is a timing chart that illustrates voltage changes of signals applied to signal lines and liquid crystal capacitors.

FIG. 4 represent a timing chart that illustrates voltage changes of signals applied to the signal lines and the liquid crystal capacitors Clc1 and Clc2. In any one of the six timing diagrams illustrated in FIG. 4, the same time axis is set as the horizontal axis, and, in the vertical axis, from an upper stage, signal levels of a signal SLS, a signal GLS, a signal CSS1, a signal CSS2, a signal LCS1, and a signal LCS2 of the source signal line SL, the scan signal line GL, the auxiliary capacitor signal line CS1, the auxiliary capacitor signal line CS2, the liquid crystal capacitor Clc1, and the liquid crystal capacitor Clc2 are illustrated. The electric potential of the opposing electrode 21 is represented as Vcom. The voltage of each signal is an electric potential difference from Vcom. Here, the magnitude of the unit voltage of the vertical axis is not necessarily uniform.

The signal SLS, for example, rises at time T0, falls at time T4 that is time after two horizontal scan periods (2H), and further rises again at time T5 that is a time further after two horizontal scan periods. In this way, while the signal SLS is an analog voltage signal of which the polarity is inverted for every two horizontal scan periods (2H), the inversion period is not limited thereto. Here, the voltage of the signal SLS between time T0 and time T3 is denoted by Vs.

Within one horizontal scan period from time T0 to time T3, the signal GLS is at a high (H) level only for a predetermined period of time T1 to time T2 and is a signal of a low (L) level for the other period.

The signals CSS1 and CSS2 are rectangular waves in which voltages Va_H and Va_L having the same absolute value and different polarities are periodically maintained in an alternating manner and have a mutual phase difference of 180 degrees. A voltage difference between Va_H and Va_L, in other words, the amplitude of the signals CSS1 and CSS2 is Vcs. The voltage of the signal CSS1 becomes Va_H from Va_L at time T0, becomes Va_L from Va_H at time T3, and further becomes Va_H from Va_L at time T4. In addition, the voltage of the signal CSS2 becomes Va_L from Va_H at time T0, becomes Va_H from Va_L at time T3, and further becomes Va_L from Va_H at time T4. Thereafter, the signals CSS1 and CSS2 periodically repeat such a series of voltage changes.

Hereinafter, changes in the voltages of the signals LCS1 and LCS2 in time as illustrated in FIG. 4 will be described. In a case where the signal GLS becomes the H level at time T1, the TFTs 15a and 15b illustrated in FIG. 2 are turned on (conductive state), and the signal SLS of the source signal line SL is applied to the sub pixel electrodes 11a and 11b and the auxiliary capacitor electrodes 13a and 13b. Accordingly, the voltages of the signals LCS1 and LCS2 applied to the liquid crystal capacitors Clc1 and Clc2 become Vs.

Next, in a case where the signal GLS becomes the L level at time T2, while the TFTs 15a and 15b are turned off (non-conductive state), at this time, according to the influence of a so-called pull-in phenomenon, the voltages of the signals LCS1 and LCS2 respectively applied to the liquid crystal capacitors Clc1 and Clc2 are decreased by Vd from the voltage immediately before time T2 and becomes Vs−Vd. At this time, it is apparent that the voltages applied to the auxiliary capacitors Ccs1 and Ccs2 are decreased by Vd as well.

Here, by forming the sub pixel electrodes 11a and 11b in a same size, the static capacitance of each of the liquid crystal capacitors Clc1 and Clc2 is CLC. In addition, by forming the auxiliary capacitor electrodes 13a and 13b in a same size and forming the auxiliary capacitor opposing electrodes 14a and 14b in a same size, the static capacitance of each of the auxiliary capacitors Ccs1 and Ccs2 is CCS.

Next, in a case where the voltage of the signal CSS1 is changed from Va_H to Va_L at time T3, the voltage Vlc1 (T3) of the liquid crystal capacitor Clc1 out of the liquid crystal capacitors Clc1 and Ccs1 connected in series is decreased by Vcs×K1 from a voltage immediately before time T3 and becomes Vs−Vd−K×Vcs. Here, K=CCS/(CCS+

CLC). Similarly, in a case where the voltage of the signal CSS2 is changed from Va_L to Va_H at time T3, the voltage Vlc2 (T3) of the liquid crystal capacitor Clc2 rises from the voltage immediately before time T3 by Vcs×K2 and becomes Vs−Vd+K×Vcs.

Thereafter, at time T4, the voltage of the signal LCS1 applied to the liquid crystal capacitor Clc1 rises from a voltage immediately before time T4 by Vcs×K and becomes Vs−Vd. Similarly, the voltage of the signal LCS2 applied to the liquid crystal capacitor Clc2 falls from the voltage immediately before time T4 by Vcs×K and becomes Vs−Vd. Such voltages are the same as the voltages immediately before time T3. Thereafter, the voltages of the signals LCS1 and LCS2 alternately repeat the voltage changes at time T3 and time T4 described above for every one horizontal scan period.

In other words, the effective value (hereinafter, referred to as effective voltage of the sub pixel SP1) V1 of the voltage applied to the liquid crystal layer 3 by the liquid crystal capacitor Clc1 corresponding to the sub pixel SP1 is V1=Vs−Vd−K×Vcs/2, and the effective value (hereinafter, referred to as effective voltage of the sub pixel SP2) V2 of the voltage applied to the liquid crystal layer 3 by the liquid crystal capacitor Clc2 corresponding to the sub pixel SP2 is V2=Vs−Vd+K×Vcs/2. Accordingly, a voltage difference between the effective voltages of the sub pixels SP1 and SP2 is V1−V2=K×Vcs.

As above, it can be understood that a voltage difference between the effective voltages of the sub pixels SP1 and SP2 is changed by changing the value of K or changing the magnitude of Vcs. For example, in order to change the value of K to large/small, CCS may be changed to large/small, or CLC may be changed to small/large. In this Embodiment 1, in a case where the voltage difference between the effective voltages described above is changed, the value of K is changed. Next, cases where the voltage difference between the effective voltages described above need to be changed and the changes will be described.

Figure 5A:
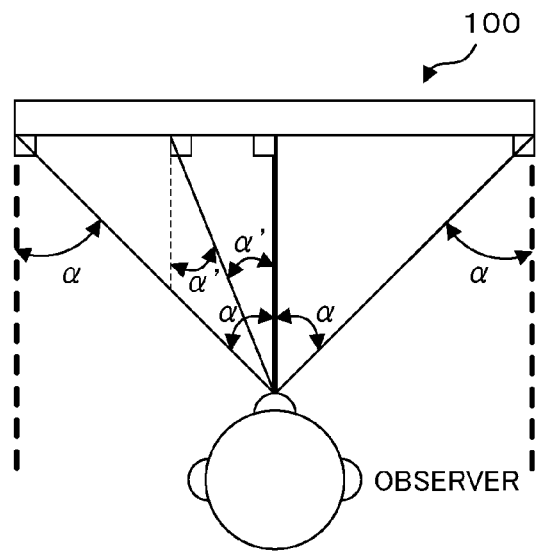
FIG. 5A is an explanatory diagram that is used for describing an angle formed by a sight line for a planar liquid crystal panel and a normal line of a display screen.
Figure 5B:
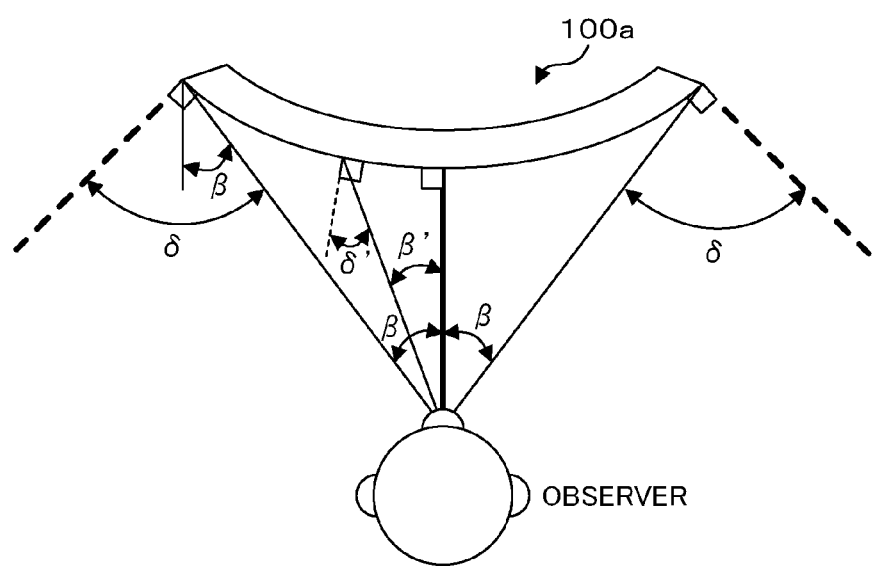
FIG. 5B is an explanatory diagram that is used for describing an angle formed by a sight line for a liquid crystal panel curved to be convex toward the front side and a normal line of a display screen.

FIG. 5A is an explanatory diagram that is used for describing an angle formed by a sight line for a planar liquid crystal panel 100 and a normal line of a display screen, and FIG. 5B is an explanatory diagram that is used for describing an angle formed by a sight line for a liquid crystal panel 100a curved to be convex toward the front side and a normal line of a display screen. Normal lines at a center portion and end portions of the display screen are denoted by a thick solid line and thick broken lines. In FIGS. 5A and 5B, viewing angles at which an observer views both ends of the display screen are respectively assumed to be 2α and 2β. For the simplification of description, in FIGS. 5A and 5B, cases will be described in which, observers observe the liquid crystal panels 100 and 100a having a same horizontal width along the display screen while facing the display screen in front thereof from the front side of the center portion of the display screen.

In the case illustrated in FIG. 5A, according to an increase of an angle formed by a sight line of a case where the observer observes the center portion of the display screen and a sight line of a case where the observer observes a position separate from the center portion is increased from α' to α, an angle formed by a normal line and a sight line at an observation target position on the display screen increases from α' to α.

On the other hand, in the case illustrated in FIG. 5B, according to an increase of an angle formed by a sight line of a case where the observer observes the center portion of the display screen and a sight line of a case where the observer observes a position separate from the center portion is increased from β' to β, an angle formed by a normal line and a sight line at an observation target position on the display screen increases from δ' to δ. In such a case, since the increase rate from δ' to δ is increased according to the curvature of the display screen of the liquid crystal panel 100a, it is apparent that the increase rate from δ' to δ is higher than the increase rate from β' to β. As described above, in the case illustrated in FIG. 5B, it can be understood that the problem of the viewing angle dependency of gamma characteristic becomes marked according to the movement of the observation target position on the display screen from the center portion to the end portion of the display screen.

Meanwhile, in a liquid crystal display apparatus having a plurality of sub pixels for each pixel, it is understood that the viewing angle dependency of gamma characteristic is improved by configuring a brightness difference or a luminance difference between the sub pixels to be different from each other by changing the effective voltages of the plurality of the sub pixels. Thus, in this Embodiment 1, a voltage difference between the effective voltages of the sub pixels SP1 and SP2 is configured to be small at the center portion of the display screen and be large at an end portion, and a voltage difference between the effective voltages is smoothly changed according to a change in the position of the pixel P therebetween. According to this, the brightness difference or the luminance difference between the sub pixels SP1 and SP2 is smoothly changed.

Figure 6:
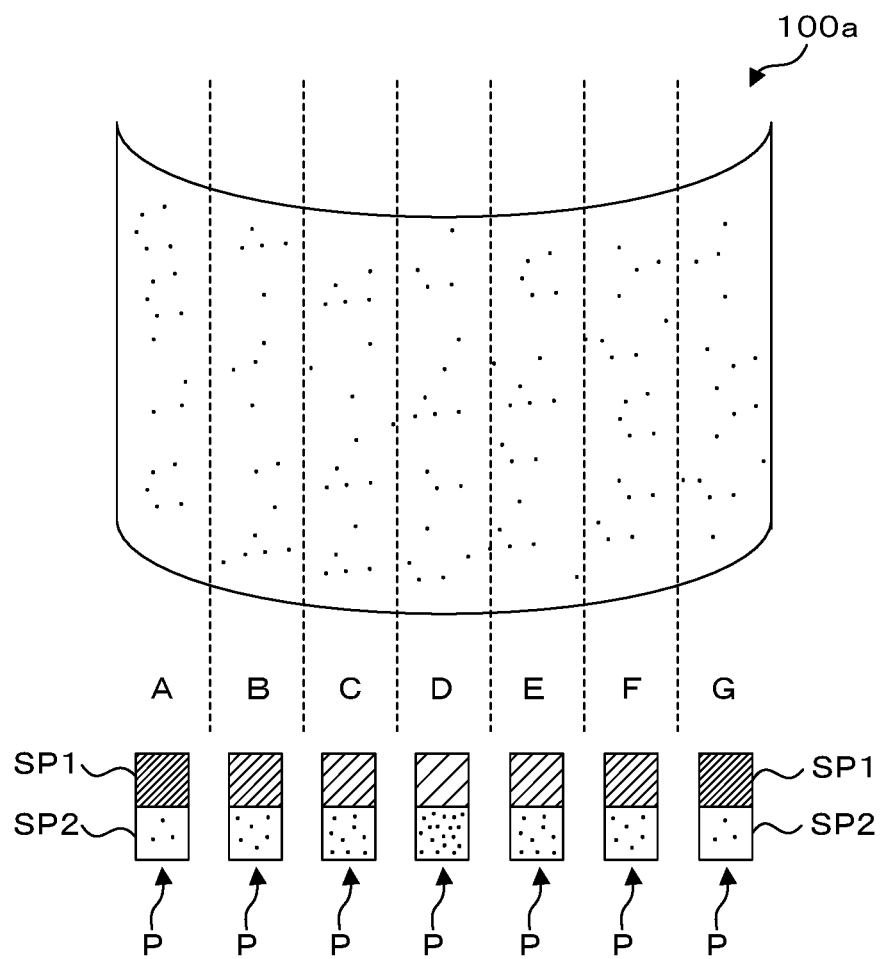
FIG. 6 is an explanatory diagram that illustrates an example in which a voltage difference between effective voltages of sub pixels is changed according to a position on a display screen.

FIG. 6 is an explanatory diagram that illustrates an example in which a voltage difference between the effective voltages of the sub pixels SP1 and SP2 is changed according to a position on a display screen. In this Embodiment 1, as illustrated in an upper stage of the diagram, the display screen of the liquid crystal panel 100a is divided into horizontally-long virtual areas from an area A to an area G in the horizontal direction. The areas A and G correspond to left and right edge portions toward the display screen, and the area D corresponds to the center portion of the display screen. The number of divisions of the display screen is not limited to seven of A to G.

Here, a voltage difference between the effective voltages of the sub pixels SP1 and SP2 included in the pixel P within each area is configured to be maximum for the areas A and G and be minimum for the area D. Then, in order from the area A to the areas B, C, and D and in order from the area G to the areas F, E, and D, the voltage difference between the effective voltages described above is configured to be decreased in a stepped manner. More specifically, the magnitude of CLC described above is configured to be minimum for the areas A and G and be maximum for the area D. In addition, the magnitude of CCS may be configured to be maximum for the areas A and G and be minimum for the area D.

As described above, by changing the voltage difference between the effective voltages of the sub pixels SP1 and SP2, for example, as illustrated in a lower stage of FIG. 6, the sub pixels SP1 of the areas A and G are displayed with brightness or luminance close to black, and the brightness or the luminance of the sub pixel SP1 is increased in order from the area A to the areas B, C, and D and in order from the area G to the areas F, E, and D. Then, oppositely to this, the sub pixels SP2 of the areas A and G are displayed with brightness or luminance close to white, and the brightness or the luminance of the sub pixel SP2 is decreased in order from the area A to the areas B, C, and D and in order from the area G to the areas F, E, and D. In this way, as illustrated in the upper stage of FIG. 6, the brightness or the luminance of the pixel P observed from the observer is distributed uniformly on the whole display screen of the liquid crystal panel 100a.

In this Embodiment 1, while a case where the display screen of the liquid crystal panel 100a is curved to be convex toward the front side has been illustrated, the display screen is not limited thereto. Thus, like the liquid crystal panel 100 illustrated in FIG. 5A, also in a case where the display screen is planar, by dividing the display screen into a plurality of areas and changing a voltage difference between the effective voltages of sub pixels SP1 and SP2 included in a pixel P included in each area, the viewing angle dependency of gamma characteristic in each area can be optimized. This is particularly effective in a case where the width of the liquid crystal panel 100 in the horizontal direction is relatively large or in a case where a distance between the observer and the display screen is relatively short.

In addition, in Embodiment 1, while the display screen of the liquid crystal panel 100a is divided into a plurality of vertically-long virtual areas in the horizontal direction, for example, in a case where the display screen is vertically long, the display screen may be divided into a plurality of horizontally-long virtual areas in the vertical direction. In such a case, according to the arrangement position of a pixel P in the vertical direction of the display screen, a voltage difference between the effective voltages of the sub pixels SP1 and SP2 may be changed.

Furthermore, in Embodiment 1, in a case where the observer observes the display screen while facing the display screen in front thereof from the front side of the center portion of the display screen, while a voltage difference between the effective voltages of the sub pixels SP1 and SP2 included in the pixel P is configured to be small in the center portion of the display screen and be large in the end portions, the configuration is not limited thereto. For example, in a case where an observer observes the display screen at a position deviating in the horizontal direction or the vertical direction from the position illustrated in FIG. 5B, a voltage difference between the effective voltages described above may be changed from small to large by using a position on the display screen faced by the observer in front thereof as the center. In other words, a voltage difference between the effective voltages described above may be changed according to the arrangement position of the pixel P in the horizontal direction and/or the vertical direction of the display screen.

In addition, in Embodiment 1, while an example has been described in which two sub pixels SP1 and SP2 are included in the pixel P, and the auxiliary capacitor opposing electrodes 14a and 14b are respectively connected to the auxiliary capacitor signal lines CS1 and CS2, the number of sub pixels is not limited to two but may be three or more, and the number of auxiliary capacitor signal lines may be increased according to the number of the sub pixels. For example, in a case where three sub pixels are included in one pixel, a voltage difference between the effective voltages of arbitrary two sub pixels may be changed as described above by using two auxiliary capacitor signal lines CS1 and CS2, and the effective voltage of the third sub pixel may be changed to be an intermediate voltage between the effective voltages of the two sub pixels. In this way, a voltage difference between the effective voltages of any two sub pixels is changed according to the position of the pixel P. A technology for configuring such an intermediate effective voltage to be the effective voltage of the third sub pixel is described in detail in Japanese Patent Application Laid-Open No. 2012-256080, description thereof will be omitted.

As described above, according to this Embodiment 1, pixels P arranged in a matrix pattern are partitioned to include a plurality of electrode pairs used for applying a voltage to the liquid crystal layer 3, and the sub pixels SP1 and SP2 included in the pixel P are partitioned to respectively include the electrode pair of the sub pixel electrode 11a and the opposing electrode 21 and the electrode pair of the sub pixel electrode 11b and the opposing electrode 21. Then, in the sub pixels SP1 and SP2 included in the pixel P or three or more sub pixels acquiring by adding a third sub pixel thereto, a voltage difference between voltages applied to the liquid crystal layer 3 by the electrode pairs or a brightness difference or a luminance difference thereof is configured to be different according to the arrangement position of the pixel P in the row direction and/or the column direction of the matrix.

In this way, a voltage difference between voltages applied to the liquid crystal layer 3 by two or more sub pixels starting from the sub pixels SP1 and SP2 included in the pixel P or a brightness difference or a luminance difference between the two or more sub pixels is changed according to the arrangement position of the pixel P in the matrix, and accordingly, the improvement factor of the viewing angle dependency of gamma characteristic is changed according to an observation target position on the display screen viewed from the observer.

Accordingly, also in a case where an angle formed by a normal line and the sight line of the observer at the observation target position on the display screen is relatively large, the degradation of gamma characteristic can be effectively suppressed.

In addition, according to Embodiment 1, as the arrangement position of the pixel P arranged in the matrix pattern is further separate from the center portion in the row direction and/or the column direction of the matrix, a voltage difference between the voltages applied to the liquid crystal layer 3 by two or more sub pixels starting from the sub pixels SP1 and SP2 or a brightness difference or a luminance difference between the two or more sub pixels is configured to be increased.

Accordingly, in a case where the observer observes the display screen from the front side of the center portion of the display screen, as the observation target position on the display screen viewed from the observer is further separate from the center portion of the screen in the horizontal direction and/or the vertical direction, the improvement factor of the viewing angle dependency of gamma characteristic can be increased.

In addition, according to Embodiment 1, in the electrode pair partitioning the sub pixels SP1 and SP2 included in the pixel P, the electrode pair of the auxiliary capacitor electrode 13a and the auxiliary capacitor opposing electrode 14a and the electrode pair of the auxiliary capacitor electrode 13b and the auxiliary capacitor opposing electrode 14b are respectively included. Out of these, the auxiliary capacitor electrode 13a is electrically connected to the sub pixel electrode 11a, and the auxiliary capacitor electrode 13b is electrically connected to the sub pixel electrode 11b. Then, voltage signals are applied to the auxiliary capacitor opposing electrodes 14a and 14b respectively from the auxiliary capacitor signal lines CS1 and CS2.

Accordingly, since mutually-different voltage signals are applied to the auxiliary capacitor opposing electrodes 14a and 14b, between the sub pixel electrode 11a connected to the auxiliary capacitor electrode 13a facing the auxiliary capacitor opposing electrode 14a and the opposing electrode 21 and between the sub pixel electrode 11b connected to the auxiliary capacitor electrode 13b facing the auxiliary capacitor opposing electrode 14b and the opposing electrode 21, mutually-different voltages can be applied. In addition, between the sub pixel electrode of the third sub pixel that is further included in the pixel P and the opposing electrode 21, a voltage different from the voltages applied to the electrodes described above can be applied to each of the sub pixels SP1 and SP2.

Furthermore, according to Embodiment 1, in the sub pixels SP1 and SP2 included in the pixel P, the magnitude of the liquid crystal capacitor Clc1 formed by the sub pixel electrode 11a and the opposing electrode 21 and the magnitude of the liquid crystal capacitor Clc2 formed by the sub pixel electrode 11b and the opposing electrode 21, for example, are configured to be CLC. In addition, the magnitude of the auxiliary capacitor Ccs1 formed by the auxiliary capacitor electrode 13a and the auxiliary capacitor opposing electrode 14a and the magnitude of the auxiliary capacitor Ccs2 formed by the auxiliary capacitor electrode 13b and the auxiliary capacitor opposing electrode 14b, for example, are configured to be CCS. A ratio of a change in the voltage applied to the liquid crystal capacitors Clc1 and Clc2 to a change in the voltage of the voltage signal applied to the auxiliary capacitor opposing electrodes 14a and 14b is K=CCS/(CCS+CLC) corresponding to a divided voltage ratio according to capacitors connected in series. In the third sub pixel that is further included in the pixel P, this similarly applies to a ratio of a voltage applied to the liquid crystal capacitor to a change in a voltage signal applied to the auxiliary capacitor opposing electrode. Here, the magnitude of K is configured to be different according to the arrangement position of a pixel P in the row direction and/or the column direction of the matrix.

Accordingly, a voltage difference between the voltages applied to the liquid crystal layer 3 by two or more sub pixels starting from the sub pixels SP1 and SP2 included in the pixel P can be changed according to the arrangement position of a pixel P in the matrix.

In addition, according to Embodiment 1, in the sub pixels SP1 and SP2 included in the pixel P, the magnitude of CCS described above is configured to be different according to the arrangement position of the pixel P in the row direction and/or the column direction of the matrix, and the value of K is configured to be changed according thereto. This similarly applies to a third sub pixel that is further included in the pixel P.

Accordingly, a voltage difference between the voltages applied to the liquid crystal layer 3 by two or more sub pixels starting from the sub pixels SP1 and SP2 included in the pixel P can be changed according to the arrangement position of a pixel P in the matrix.

(Embodiment 2)

While Embodiment 1 employs a form in which the amplitudes of the signals CSS1 and CSS2 respectively applied to the auxiliary capacitor signal lines CS1 and CS2 are fixed to Vcs, Embodiment 2 employs a form in which the amplitudes of signals CSS1 and CSS2 are changed according to the position of a pixel P.

Figure 7:
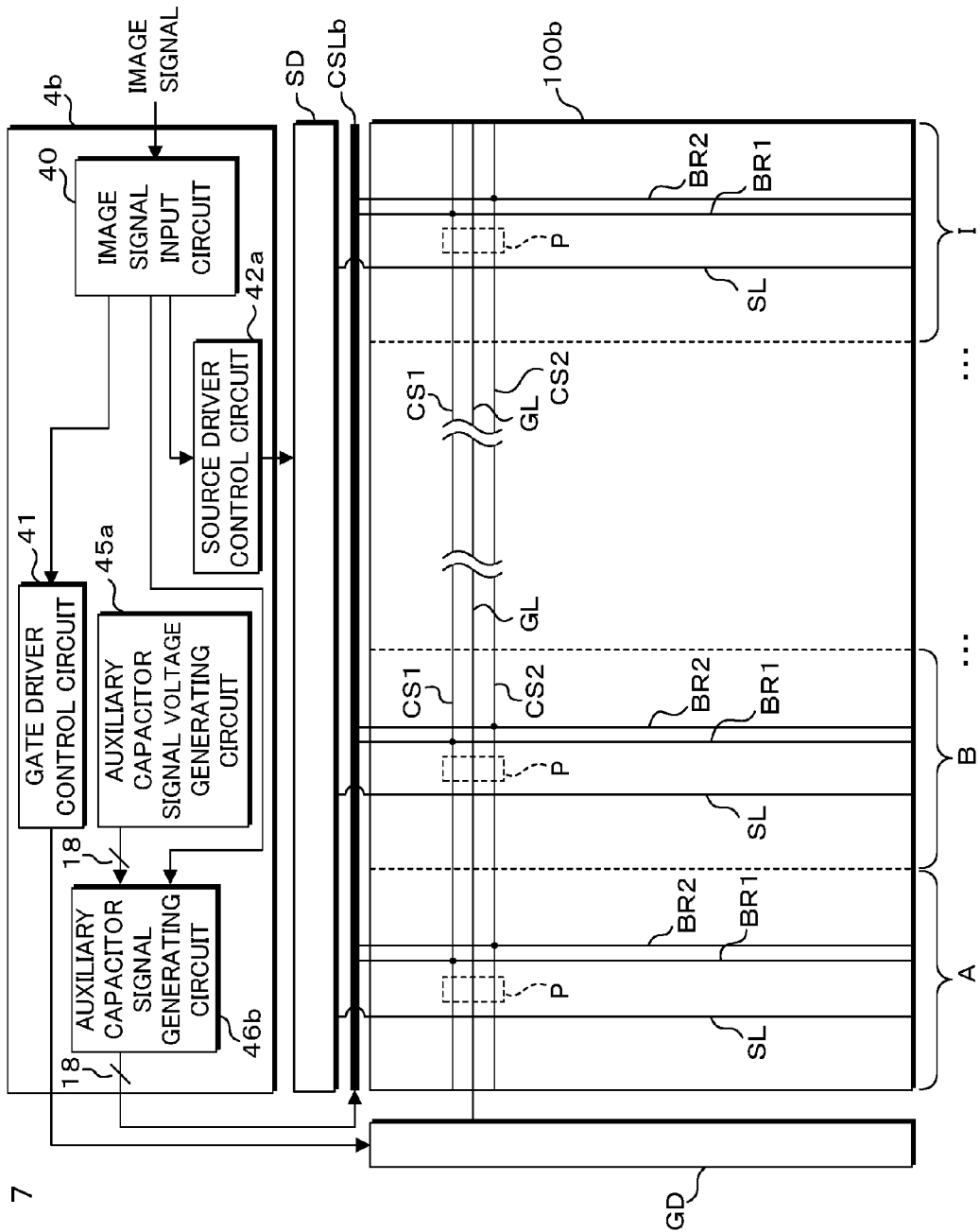
FIG. 7 is a block diagram that illustrates an example of the configuration of a liquid crystal display apparatus according to Embodiment 2 of the present invention.

FIG. 7 is a block diagram that illustrates an example of the configuration of a liquid crystal display apparatus according to Embodiment 2 of the present invention. The liquid crystal display apparatus according to Embodiment 2 includes a liquid crystal panel 100b in which pixels P are arranged in a matrix pattern in the vertical direction and the horizontal direction of a display screen. In the liquid crystal panel 100b, the display screen is curved to be convex toward the front side. For the liquid crystal panel 100b, representative three pixels P and signal lines relating to the pixels P will be focused in the illustration. Hereinafter, a same reference sign will be assigned to a configuration similar to that of Embodiment 1, and a part or the whole of description thereof will be omitted.

The liquid crystal panel 100b is divided into vertically-long areas of an area A to an area I in the horizontal direction. The areas A and I correspond to left and right edge portions toward the display screen, and an area E corresponds to a center portion of the display screen. The number of divisions of the display screen is not limited to nine of A to I. Auxiliary capacitor signal lines CS1 and CS2 are segmented for each of the areas of A to I. On the other lateral side of the pixels P in the horizontal direction, branch wirings BR1 and BR2 used for applying voltage signals to the auxiliary capacitor signal lines CS1 and CS2 are linearly arranged in the vertical direction. The branch wirings BR1 and BR2 may be arranged for each pixel P or be arranged to be common to the areas described above.

In addition, the liquid crystal display apparatus according to Embodiment 2 includes: a gate driver GD; a source driver SD; an inter-auxiliary capacitor signal wiring CSLb used for applying voltage signals to the branch wirings BR1, BR2, BR1, BR2, . . . BR1, BR2; and a display control circuit 4b that controls display using the liquid crystal panel 100b by using the gate driver GD, the source driver SD, and the inter auxiliary capacitor signal wiring CSLb.

The display control circuit 4b includes: an image signal input circuit 40; a gate driver control circuit 41; and a source driver control circuit 42a. In addition, the display control circuit 4a includes: an auxiliary capacitor signal voltage generating circuit 45a that generates signal voltages determining the signal amplitudes of voltage signals applied to the auxiliary capacitor signal lines CS1 and CS2; and an auxiliary capacitor signal generating circuit (corresponding to an auxiliary capacitor signal line driving circuit) 46b that generates voltage signals applied to the auxiliary capacitor signal lines CS1 and CS2 based on a DC signal voltage generated by the auxiliary capacitor signal voltage generating circuit 45a and a timing signal transmitted from the image signal input circuit 40.

The auxiliary capacitor signal generating circuit 46b is configured to drive the auxiliary capacitor signal lines CS1 and CS2 by using voltage signals having signal amplitudes different from the areas of A to I through the inter-auxiliary capacitor signal wiring CSLb. In such a case, by connecting the auxiliary capacitor signal lines CS1 and CS2 without segmented for each of the areas, the signal amplitude may be continuously changed between areas neighboring to each other.

Figure 8:
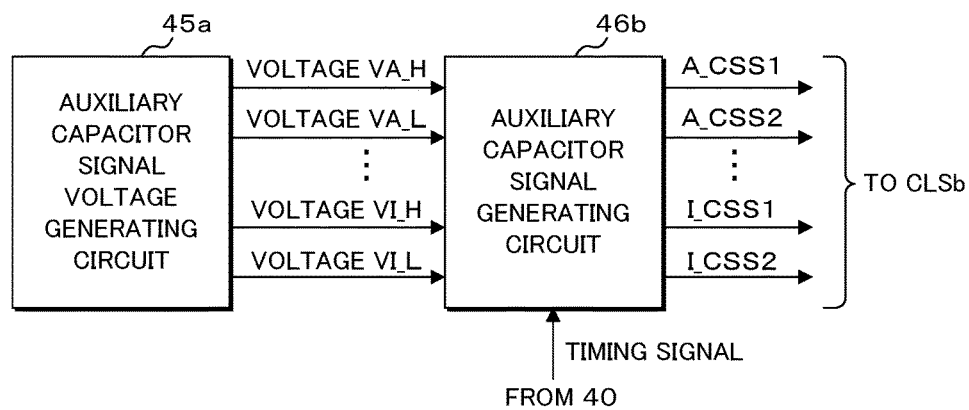
FIG. 8 is an explanatory diagram that is used for describing voltages and signals outputted by an auxiliary capacitor signal voltage generating circuit and an auxiliary capacitor signal generating circuit.

FIG. 8 is an explanatory diagram that is used for describing voltages and signals outputted by the auxiliary capacitor signal voltage generating circuit 45a and the auxiliary capacitor signal generating circuit 46b. The auxiliary capacitor signal voltage generating circuit 45a generates DC signal voltages corresponding to Va_H and Va_L illustrated in FIG. 4 of Embodiment 1 for each of the areas A to I. More specifically, the auxiliary capacitor signal voltage generating circuit 45a generates voltages VA_H and VA_L having a same absolute value and different polarities (hereinafter, similarly) for the area A and generates voltages VB_H and VB_L for the area B, . . . , and generates voltages VI_H and VI_L for the area I. Thus, in this Embodiment 2, there are 18 kinds of signal voltages outputted by the auxiliary capacitor signal voltage generating circuit 45a.

The auxiliary capacitor signal generating circuit 46b generates signal voltages corresponding to the signals CSS1 and CSS2 illustrated in FIG. 4 of Embodiment 1 for each of the areas A to I based on a signal voltage transmitted from the auxiliary capacitor signal voltage generating circuit 45a and a timing signal transmitted from the image signal input circuit 40. More specifically, the auxiliary capacitor signal generating circuit 46b generates signals A_CSS1 and A_CSS2 based on voltages VA_H and VA_L for the area A, generates signals B_CSS1 and B_CSS2 based on voltages VB_H and VA_L for the area B, . . . , and generates signals I_CSS1 and I_CSS2 based on voltages VI_H and VI_L for the area I. Thus, in Embodiment 2, there are 18 kinds of voltage signals outputted by the auxiliary capacitor signal generating circuit 46b.

Next, a simulation result at the time of changing the signal amplitudes of voltage signals applied to the auxiliary capacitor signal lines CS1 and CS2 according to the position of a pixel P on the display screen will be described.

Figure 10:
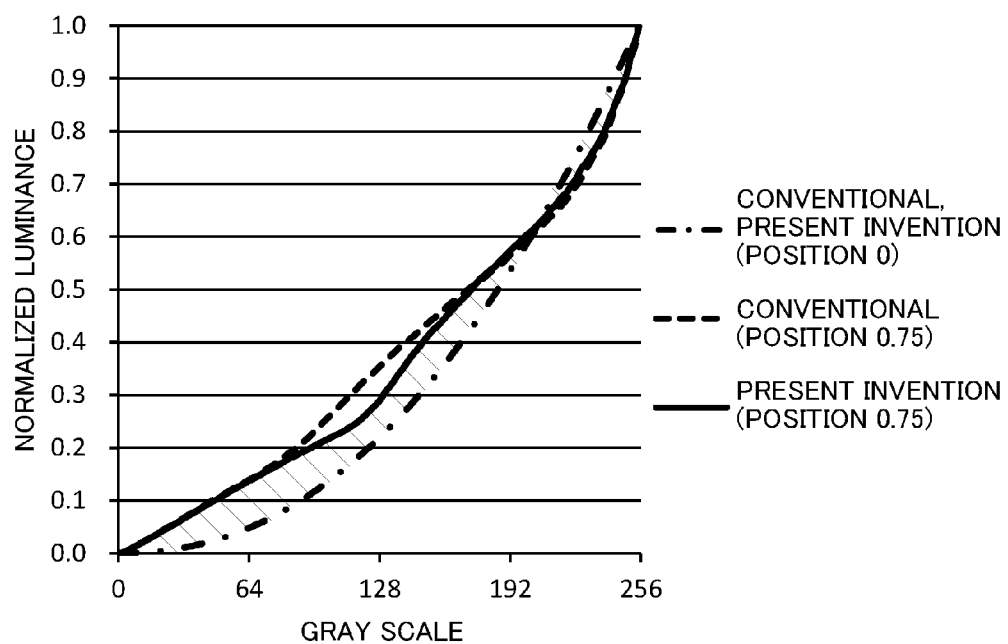
FIG. 10 is a graph that illustrates a relation between a gray scale and luminance.
Figure 11:
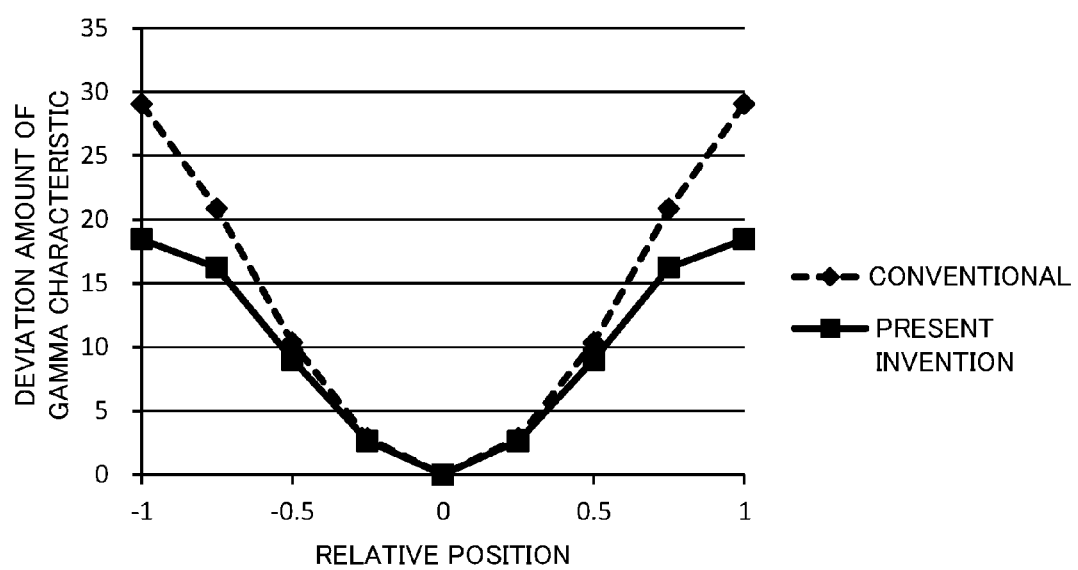
FIG. 11 is a graph that illustrates a relation between a position on a display screen and a deviation amount of gamma characteristic.

FIG. 9 is a table that illustrates a relation between a position on the display screen and the amplitudes of signals applied to the auxiliary capacitor signal lines CS1 and CS2. FIG. 10 is a graph that illustrates a relation between a gray scale and luminance. FIG. 11 is a graph that illustrates a relation between a position on the display screen and a deviation amount of gamma characteristic.

A liquid crystal panel used for the simulation illustrated in FIGS. 9, 10, and 11 is a 60-inch type, and, as the planar dimension before curved, a vertical dimension is 748.44 mm, and a horizontal dimension is 1330.56 mm. The simulation is performed for a case where this liquid crystal panel curved in a cylindrical shape along the longitudinal direction (the lateral direction=the horizontal direction) such that the radius of curvature is 800 mm, and the display screen is convex toward the front side is regarded as the liquid crystal panel 100b, and an observer observes the display screen from the center portion of the display screen while facing the display screen in front thereof. In addition, a viewing distance from the observer to the center portion of the display screen is 2245.32 mm. In such a case, a viewing angle at which the observer observes both ends of the display screen is about 47 degrees.

In the case illustrated in FIG. 9, as relative positions on the display screen, values of the positions of the left-end portion, the center portion, and the right-end portion of the display screen in the horizontal direction are set to −1.00, 0.00 and 1.00, and values of positions therebetween are uniformly assigned according to a distance along the display screen. Thus, positions having values of −1.00, 0.00, and 1.00 respectively correspond to a left-end portion of the area A, a center portion of the area E, and a right-end portion of the area I. In addition, positions having values of −0.75, −0.50, and −0.25 respectively correspond to the areas B, C, and D, and positions having values of 0.25, 0.50, and 0.75 respectively correspond to the areas F, G, and H.

The signal amplitudes of voltage signals applied to the auxiliary capacitor signal lines CS1 and CS2 in the areas are 4.50 V, 2.68 V, 2.14 V, 1.82 V, 1.50 V, 1.82 V, 2.14 V, 2.68 V, and 4.50 V for the areas A, B, C, D, E, F, G, H, and I. In other words, VA_H−VA_L=VI_H−VI_L=4.50 V, and VE_H−VE_L=1.50 V.

In addition, in FIGS. 10 and 11, "CONVENTIONAL" represents a case of a liquid crystal panel in which the signal amplitude of the voltage signals described above is fixed to 1.50 V.

Next, referring to FIG. 10, in the drawing, the horizontal axis represents a gray scale based on digital image data separated by the image signal input circuit 40, and the vertical axis represents luminance of which the maximum value is normalized to "1". In the drawing, each curve illustrates a gamma characteristic representing the luminance observed at each relative position on the display screen with respect to the gray scale of an input signal. A dashed line illustrates a characteristic at a relative position having a value of 0.00 in a conventional liquid crystal panel and the liquid crystal panel 100b according to the present invention and represents a standard characteristic having a γ value of 2.2. In addition, each of a broken line and a solid line represents characteristics of a relative position having a value of 075 in the conventional liquid crystal panel and the liquid crystal panel 100b according to the present invention. In the liquid crystal panel 100b according to the present invention, it is clearly disclosed that the γ value is closer to a characteristic of 2.2 than the conventional liquid crystal panel.

Here, a deviation amount between the gamma characteristic at the relative position having a value of 0.00 and a gamma characteristic at a relative position having a value other than 0.00 is represented using an index that is proportional to the area of a region surrounded by the characteristic curve at each relative position. For example, in the liquid crystal panel 100b according to the present invention, a deviation amount of gamma characteristic at the relative position having a value of 0.75 corresponds to the area of a region surrounded by diagonal lines in FIG. 10.

Next, referring to FIG. 11, in the drawing, the horizontal axis represents a relative position on the display screen, and the vertical axis represents a deviation amount of gamma characteristic. In the drawing, a broken line and a solid line respectively represents the deviation amounts for a conventional liquid crystal panel and the liquid crystal panel 100b according to the present invention. In the conventional liquid crystal panel, while the deviation amounts of gamma characteristic at relative position having values of −1.00 and 1.00 increase up to 30 on the whole, in the liquid crystal panel 100b according to the present invention, the deviation amount of gamma characteristic at the same relative positions is settled into about 19. Also for the other relative positions, the liquid crystal panel 100b according to the present invention has a deviation amount smaller than the conventional liquid crystal panel.

In addition, in Embodiment 2, while an example has been described in which two sub pixels SP1 and SP2 are included in the pixel P, the number of sub pixels is not limited to two but may be three or more, and the number of auxiliary capacitor signal lines may be increased according to the number of the sub pixels. For example, in a case where three sub pixels are included in one pixel, a voltage difference between the effective voltages of arbitrary two sub pixels may be changed as described above by using two auxiliary capacitor signal lines CS1 and CS2, and the effective voltage of the third sub pixel may be changed to be an intermediate voltage between the effective voltages of the two sub pixels. In a case where the effective voltage of the third sub pixel is changed according to a voltage signal supplied from the third auxiliary capacitor signal line, the auxiliary capacitor signal voltage generating circuit 45a, for example, generates a third signal voltage, for example, that becomes VA_M, VB_M, . . . VI_M, and the auxiliary capacitor signal generating circuit 46b generates a third voltage signal that becomes A_CSS3, B_CSS3, . . . I_CSS3, and the generated voltage signals may be applied to the third auxiliary capacitor signal line through the inter auxiliary capacitor signal wiring CSLb.

As described above, according to this Embodiment 2, the auxiliary capacitor signal generating circuit 46b applies signals that have different amplitudes and inverted polarities according to the arrangement position of a pixel P in the row direction and/or the column direction of the matrix to the auxiliary capacitor signal lines CS1 and CS2 (a case where the third auxiliary capacitor signal line is added is included).

Accordingly, a voltage difference between the voltages applied to the liquid crystal layer 3 by two or more sub pixels starting from the sub pixels SP1 and SP2 included in the pixel P can be changed according to the arrangement position of a pixel P in the matrix.

(Embodiment 3)

While Embodiment 1 employs a form in which a voltage difference is caused between the voltages of the sub pixel electrodes 11a and 11b by applying mutually-different voltage signals to the auxiliary capacitor signal lines CS1 and CS2, Embodiment 3 employs a form in which source signals having mutually-different voltages are applied to sub pixel electrodes 11a and 11b through two source signal lines SL1 and SL2 arranged for each pixel P. In any of the forms, a voltage difference between voltages applied to a liquid crystal layer 3 by sub pixels SP1 and SP2 occurs.

Figure 12:
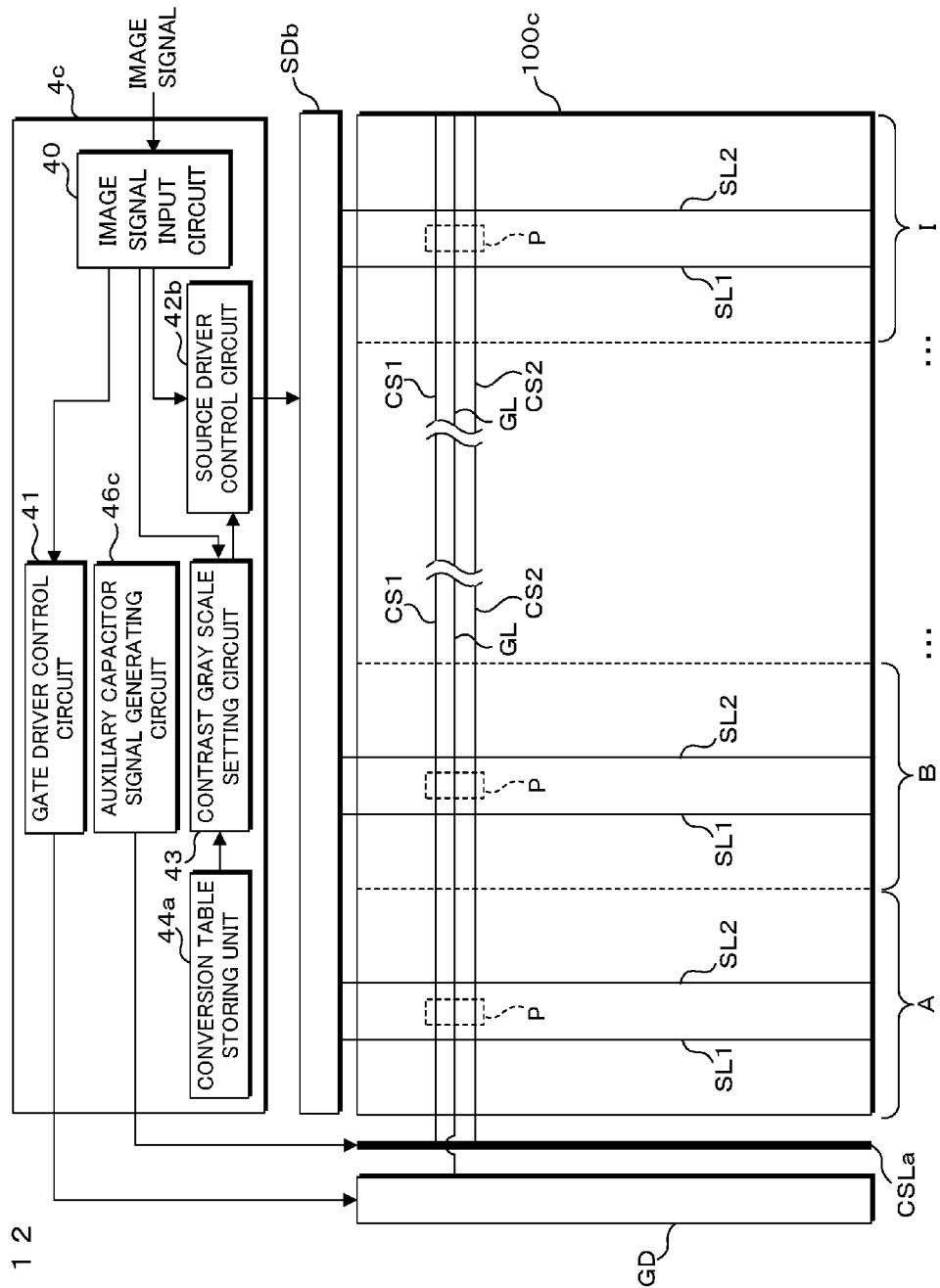
FIG. 12 is a block diagram that illustrates an example of the configuration of a liquid crystal display apparatus according to Embodiment 3 of the present invention.

FIG. 12 is a block diagram that illustrates an example of the configuration of a liquid crystal display apparatus according to Embodiment 3 of the present invention. FIG. 13 is an explanatory diagram that schematically illustrates a configuration partitioning a pixel P in a liquid crystal panel 100c according to Embodiment 3 of the present invention. The liquid crystal display apparatus illustrated in FIG. 12 includes the liquid crystal panel 100c in which pixels P are arranged in a matrix pattern in the vertical direction and the horizontal direction of a display screen. In the liquid crystal panel 100c, the display screen is curved to be convex toward the front side. For the liquid crystal panel 100c, representative three pixels P and signal lines relating to the pixels P will be focused in the illustration. Hereinafter, a same reference sign will be assigned to a configuration similar to that of Embodiment 1, and a part or the whole of description thereof will be omitted.

In the case illustrated in FIG. 13, the configuration of the sub pixels SP1 and SP2 included in a pixel P and the configuration of electrode pairs partitioning the sub pixels SP1 and SP2 are similar to those of the case according to Embodiment 1 illustrated in FIG. 2. Terminals of TFTs 15a and 15b are respectively connected to sub pixel electrodes 11a and 11b.

On one lateral side and the other lateral side of the pixel P in the horizontal direction, source signal lines SL1 and SL2 used for applying source signals to the sub pixel electrodes 11a and 11b through the TFTs 15a and 15b are linearly arranged in the vertical direction. The other ends of the TFTs 15a and 15b are connected to the source signal lines SL1 and SL2. Auxiliary capacitor opposing electrodes 14a and 14b are respectively connected to auxiliary capacitor signal lines CS1 and CS2. Gate electrodes of the TFTs 15a and 15b are connected to a scan signal line GL.

Referring to FIG. 12, the liquid crystal panel 100c is divided into vertically-long areas of areas A to I in the horizontal direction. The liquid crystal display apparatus according to Embodiment 3 further includes: a gate driver GD; a source driver (corresponding to a data signal line driving circuit) SDb applying source signals to the source signal lines SL1, SL2, SL1, SL2, . . . SL1, SL2; an inter-auxiliary capacitor signal wiring CSLa; and a display control circuit 4c that controls display using the liquid crystal panel 100c by using the gate driver GD, the source driver SDb, and the inter-auxiliary capacitor signal wiring CSLa.

The display control circuit 4c includes: an image signal input circuit 40; a gate driver control circuit 41; and a source driver control circuit 42b that controls the source driver SDb. In addition, the display control circuit 4c includes: an auxiliary capacitor signal generating circuit 46c that generates voltage signals applied to the auxiliary capacitor signal lines CS1 and CS2; a contrast gray scale setting circuit (corresponding to an image signal converting unit) 43 that converts a gray scale value based on digital image data separated by the image signal input circuit 40 and supplies the converted gray scale value to the source driver control circuit 42b; and a conversion table storing unit (corresponding to a storage unit) 44a that stores a conversion table referred to by the contrast gray scale setting circuit 43. The auxiliary capacitor signal generating circuit 46c is configured to drive the auxiliary capacitor signal lines CS1 and CS2 through the inter auxiliary capacitor signal wiring CSLa by using a DC voltage signal.

FIG. 14 is an explanatory diagram that is used for describing a conversion of a gray scale using the contrast gray scale setting circuit 43. The conversion table storing unit 44a stores a conversion table (LUT=look up table) representing a correspondence relation between each of input gray scale values of 0 to 255 and an output gray scale value higher than the input gray scale value and an output gray scale value lower than the input gray scale value for each of areas A to I. The contrast gray scale setting circuit 43 converts an input gray scale value supplied from the image signal input circuit 40 into two high/low output gray scale values based on a timing signal supplied from the image signal input circuit 40 by referring to the conversion table corresponding to one of the areas A to I.

The two high/low output gray scale values converted from the input gray scale value are supplied to the source driver control circuit 42b and are converted into two source signals having mutually-different high and low voltages, and the converted two source signals are applied to the source signal lines SL1 and SL2 through the source driver SDb. In this case, a voltage difference between the source signals applied to the source signal lines SL1 and SL2 is different for each of the areas A to I also in a case where the input gray scale value is the same and is optimally adjusted according to the gray scale value. In this way, the voltage difference between two source signals applied to the pixel P is reflected on a voltage difference between the voltages applied to the liquid crystal layer 3 by the sub pixels SP1 and SP2.

In addition, in this Embodiment 3, while an example has been described in which two sub pixels SP1 and SP2 are included in the pixel P, the number of sub pixels is not limited to two but may be three or more, and the number of source signal lines may be increased according to the number of the sub pixels. For example, in a case where three sub pixels are included in one pixel, a voltage difference between the effective voltages of arbitrary two sub pixels may be changed as described above by using two source signal lines SL1 and SL2, and the effective voltage of the third sub pixel may be changed to be an intermediate voltage between the effective voltages of the two sub pixels by using the third source signal line and a third TFT.

As described above, according to this Embodiment 3, in the electrode pair partitioning the sub pixels SP1 and SP2 included in the pixel P, the electrode pair of the sub pixel electrode 11a and the opposing electrode 21 facing each other through the liquid crystal layer 3 and the electrode pair of the sub pixel electrode 11b and the opposing electrode 21 are included. Then, source signals are applied to the sub pixel electrodes 11a and 11b from the source signal lines SL1 and SL2 through the TFTs 15a and 15b. In addition, a source signal is applied to the sub pixel electrodes of the third sub pixel from the source signal lines SL1 and SL2 (or the third source signal line) through the third TFT.

Accordingly, voltages having mutually-different magnitudes can be applied to the liquid crystal layer 3 by using two or more sub pixels starting from the sub pixels SP1 and SP2 included in each pixel P.

In addition, according to Embodiment 3, for each of nine areas acquired by dividing the arrangement positions of pixels P in the row direction and/or the column direction of the matrix, correspondence relations between the gray scale value relating to image data and a plurality of gray scale values having mutually-different magnitudes are stored in the conversion table storing unit 44a in advance. Then, the contrast gray scale setting circuit 43 converts the gray scale value based on image data separated from an image signal received by the image signal input circuit 40 into a plurality of gray scale values having mutually-different magnitudes based on the stored content of the conversion table storing unit 44a, and the source driver SDb applies source signals corresponding to the plurality of gray scale values converted by the source driver SDb to the source signal lines SL1 and SL2 (or the third source signal line).

Accordingly, a voltage difference between the voltages applied to the liquid crystal layer 3 by two or more sub pixels starting from the sub pixels SP1 and SP2 included in a pixel P can be changed according to the divided position of the pixel P in the matrix.

(Embodiment 4)

While Embodiment 2 employs a form in which the viewing distance of an observer and the curvature of the liquid crystal panel 100b are not considered in a case where the amplitudes of the signals CSS1 and CSS2 are changed according to the position of the pixel P, Embodiment 4 employs a form in which, on top of the consideration of the viewing distance of an observer and/or the curvature of the liquid crystal panel 100b, the amplitudes of the signals CSS1 and CSS2 are changed according to the position of the pixel P.

Figure 15:
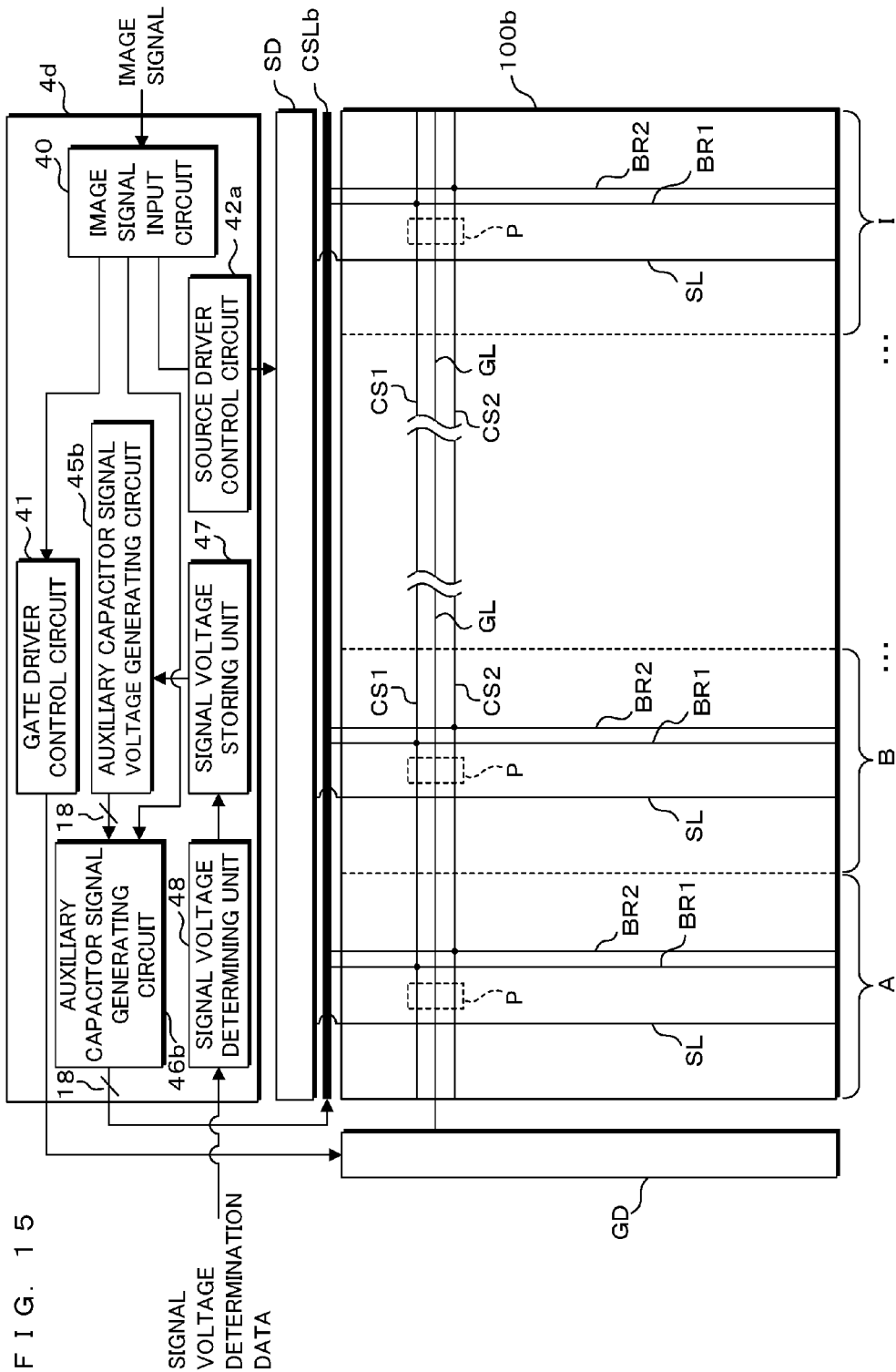
FIG. 15 is a block diagram that illustrates an example of the configuration of a liquid crystal display apparatus according to Embodiment 4 of the present invention.

FIG. 15 is a block diagram that illustrates an example of the configuration of a liquid crystal display apparatus according to Embodiment 4 of the present invention. The liquid crystal display apparatus includes a liquid crystal panel 100b in which pixels P are arranged in a matrix pattern in the vertical direction and the horizontal direction of a display screen. The liquid crystal panel 100b is the same as that used in Embodiment 2. Hereinafter, a same reference sign will be assigned to a configuration similar to that of Embodiments 1 and 2, and a part or the whole of description thereof will be omitted.

The liquid crystal display apparatus according to Embodiment 4 includes: a gate driver GD; a source driver SD; an inter-auxiliary capacitor signal wiring CSLb; and a display control circuit 4d that controls display using the liquid crystal panel 100b by using the gate driver GD, the source driver SD, and the inter-auxiliary capacitor signal wiring CSLb.

The display control circuit 4d includes: an image signal input circuit 40; a gate driver control circuit 41; and a source driver control circuit 42a. In addition, the display control circuit 4d includes: an auxiliary capacitor signal voltage generating circuit 45b that generates the voltages VA_H, VA_L, VB_H, VB_L, . . . , VI_H, VI_L (see FIG. 8) described above; and an auxiliary capacitor signal generating circuit (corresponding to an auxiliary capacitor signal line driving circuit) 46b that generates voltage signals applied to the auxiliary capacitor signal lines CS1 and CS2 based on a DC signal voltage generated by the auxiliary capacitor signal voltage generating circuit 45b and a timing signal transmitted from the image signal input circuit 40.

In addition, the display control circuit 4d includes: a signal voltage storing unit 47 that stores a plurality of pieces of information designating the magnitudes of voltages VA_H, VA_L, VB_H, VB_L, . . . , VI_H, VI_L to be generated by the auxiliary capacitor signal voltage generating circuit 45b; and a signal voltage determining unit 48 that receives signal voltage determination data supplied from the outside and determines one piece of information to be read from the signal voltage storing unit 47.

The auxiliary capacitor signal voltage generating circuit 45b reads the information determined by the signal voltage determining unit 48 from the signal voltage storing unit 47 and generates voltages VA_H, VA_L, VB_H, VB_L, . . . , VI_H, VI_L of magnitudes designated by the read information. In other words, the amplitudes of the voltage signals generated by the auxiliary capacitor signal generating circuit 46b for each area are changed according to the signal voltage determination data supplied from the outside. In this way, a voltage difference between the voltages applied to the liquid crystal layer 3 by two or more sub pixels starting from the sub pixels SP1 and SP2 and a brightness difference or a luminance difference between the two or more sub pixels are not only changed according to the arrangement position of the pixel P but also changed according to the signal voltage determination data supplied from the outside.

In addition, the signal voltage determining unit 48 may be configured to supply information used for selecting one piece of information from among the plurality of pieces of information stored in the signal voltage storing unit 47 to the auxiliary capacitor signal voltage generating circuit 45b, and the auxiliary capacitor signal voltage generating circuit 45b may read one piece of information from among the plurality of pieces of information stored in the signal voltage storing unit 47 based on the information supplied from the signal voltage determining unit 48.

Among the voltages VA_H, VB_H, . . . , VI_H, based on the information stored in the signal voltage storing unit 47, the voltages VA_H and VI_H are maximum, and the voltage VE_H is minimum, and the voltages of VA_H to VE_H and the voltages of VI_H to VE_H are decreased in a stepped manner. This is similarly applied to the voltages VA_L, VB_L, . . . , VI_L having the same absolute values as those of the voltages VA_H, VB_H, . . . VI_H and having different polarities.

Such voltages are determined in advance such that the viewing angle dependency of gamma characteristics is appropriately improved over all the area of the display screen. In such a case, according to "large/small" of the magnitudes of VA_H–VA_L and VI_H–VI_L, a voltage difference between the voltages applied to the liquid crystal layer 3 by the sub pixels SP1 and SP2 of the pixels P disposed at both end portions of the display screen become "large/small", and the improvement factor of the viewing angle dependency of gamma characteristic becomes "large/small". According to "large/small" of the magnitudes of VA_H–VA_L and VI_H–VI_L corresponding to the both end portions of the display screen, the magnitude of VE_H–VE_L corresponding to the center portion of the display screen may be configured to be "large/small", or the magnitude of VE_H–VE_L may be configured to be constant.

Next, signal voltage determination data will be described.

Figure 16A:
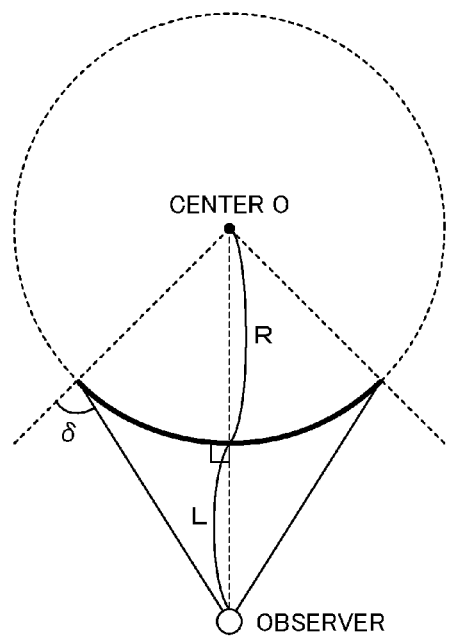
FIG. 16A is an explanatory diagram that is used for describing an angle formed by a sight line for a liquid crystal panel curved to be convex toward the front side and a normal line of a display screen.
Figure 16B:
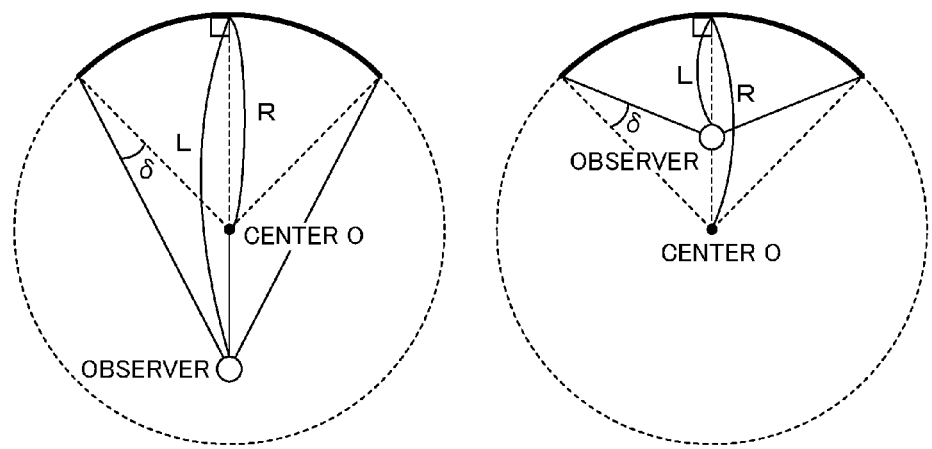
FIG. 16B is an explanatory diagram that is used for describing an angle formed by a sight line for a liquid crystal panel curved to be concave toward the front side and a normal line of a display screen.

FIG. 16A is an explanatory diagram that is used for describing an angle formed by a sight line for a liquid crystal panel 100*b* curved to be convex toward the front side and a normal line of a display screen. FIG. 16B is an explanatory diagram that is used for describing an angle formed by a sight line for a liquid crystal panel 100*e* curved to be concave toward the front side and a normal line of a display screen. The two liquid crystal panels 100*e* illustrated in FIG. 16B are the same, and only the positions of the observer with respect to the display screen are different.

In the liquid crystal panels 100*b* and 100*e* illustrated in FIGS. 16A and 16B, the display screens are curved in a cylindrical shape along the longitudinal direction (the lateral direction=the horizontal direction) so as to be convex and concave toward the front side. The curvature center of each of the liquid crystal panels 100*b* and 100*e* is represented as center O. An observer is located on a segment joining the center portion of the display screen and the center O or an extension of this segment and faces the display screen in front thereof. Here, a separation distance between the center portion of the display screen and location of the observer, in other words, the viewing distance is denoted by L, and the radius of curvature of the display screen is denoted by R. In a case where the observation target position is an end portion on the display screen, an angle formed by the normal line of the display screen at the observation target position and the sight line of the observer is denoted by δ.

As illustrated in FIG. 16A, in a case where the liquid crystal panel 100*b* is convex toward the front side, when the value of R is fixed, it is apparent that the value of δ increases as the value of L decreases. To the contrary, when the value of L is fixed, it is apparent that the value of δ increases as the value of R decreases. Here, there is a limit when the value of δ is 90 degrees. As the value of δ increases, the problem of the viewing angle dependency of gamma characteristic becomes marked, which is described as above. Accordingly, in a case where the "large/small" of the value of the signal voltage determination data is associated with "large/small" of the value of L that is the viewing distance or the value of R that is the radius of curvature of the display screen, as the value of the signal voltage determination data increases (or decreases), information designating VA_H, VA–L and VI_H, VI–L having a smaller (or larger) absolute value is determined by the signal voltage determining unit 48.

On the other hand, as illustrated in FIG. 16B, in a case where the liquid crystal panel 100*e* is concave toward the front side, when the value of R is fixed, the value of δ decreases (see the right case illustrated in the drawing) as the value of L increases from 0 to the value of R, and as the value of L further increases from the value of R, the value of δ increases (see the left case illustrated in the drawing). To the contrary, when the value of L is fixed, the value of δ decreases (see the left case illustrated in the drawing) as the value of R increases from a value less than L to the value of L, and as the value of R further increases from the value of L, the value of δ increases (see the right case illustrated in the drawing).

Accordingly, in a case where the "large/small" of the value of the signal voltage determination data is associated with the "large/small" of the value of L, when L<R, as the value of the signal voltage determination data becomes larger (or smaller), the information designating VA_H, VA–L and VI_H, VI–L having a smaller (larger) absolute value is determined. On the other hand, when L>R, as the value of the signal voltage determination data becomes larger (or smaller), the information designating VA_H, VA–L and VI_H, VI–L having a larger (smaller) absolute value is determined.

In contrast to this, in a case where the "large/small" of the value of the signal voltage determination data is associated with "large/small" of the value of R, when R<L, as the value of the signal voltage determination data becomes larger (or smaller), the information designating VA_H, VA–L and VI_H, VI–L having a smaller (larger) absolute value is determined. On the other hand, when R>L, as the value of the signal voltage determination data becomes larger (or smaller), the information designating VA_H, VA–L and VI_H, VI–L having a larger (smaller) absolute value is determined.

As above, it is preferable to switch the stored content of the signal voltage storing unit 47 in accordance with whether the liquid crystal panel is convex or concave toward the front side. In addition, it is more preferable to further switch the stored content of the signal voltage storing unit 47 in accordance with the correspondence of the signal voltage determination data with the value of R or the value or L. Furthermore, in a case where the liquid crystal panel is concave toward the front side, it is preferable that the stored content of the signal voltage storing unit 47 is further switched according to a difference of the magnitude relation between the value of R and the value of L. In other words, by switching the stored content of the signal voltage storing unit 47, in any of the cases described above, based on the signal voltage determination data, one piece of information that is optimal for the radius of curvature of the liquid crystal panel and/or the viewing distance can be determined from among a plurality of pieces of information stored in the signal voltage storing unit 47.

In this Embodiment 4, while a case has been described in which the signal voltage determining unit 48 acquires signal voltage determination data from the outside, in a case where the radius of curvature and the viewing distance are determined to be fixed, the signal voltage determining unit 48 may not be used. In such a case, the signal voltage storing unit 47 may store optimal information that is based on the radius of curvature and the viewing distance determined in advance.

As described above, according to this Embodiment 4, in accordance with the radius R of curvature of the display screen of the liquid crystal panel 100*b* or 100*e*, a voltage difference between the voltages applied to the liquid crystal layer 3 in accordance with the two or more sub pixels starting from the sub pixels SP1 and SP2 or a brightness difference or a luminance difference between the two or more sub pixels is different.

Accordingly, in order to compensate for a change in the degree of influence of the viewing angle dependency of gamma characteristic according to the curvature of the display screen, the improvement factor of the viewing angle dependency of gamma characteristic can be changed. In addition, also in a case where the radius R of curvature of the display screen is not constant in the plane, a similar effect can be acquired.

In addition, according to Embodiment 4, in accordance with the viewing distance L from the center portion of the display screen of the liquid crystal panel 100*b* or 100*e* to a position separate in the direction of the normal line on the front side of the display screen, a voltage difference between the voltages applied to the liquid crystal layer 3 in accordance with two or more sub pixels starting from the sub pixels SP1 and SP2 or a brightness difference or a luminance difference between the two or more sub pixels is different.

Accordingly, in order to compensate for a change in the degree of influence of the viewing angle dependency of gamma characteristic according to the viewing distance L for the display screen, the improvement factor of the viewing angle dependency of gamma characteristic can be changed.

In addition, according to Embodiment 4, as the radius of curvature of the display screen of the liquid crystal panel 100*b* curved to be convex toward the front side is smaller (in other words, the curvature is larger) or as the viewing distance is shorter, a voltage difference between the voltages applied to the liquid crystal layer 3 in accordance with the two or more sub pixels staring from the sub pixels SP1 and SP2 or a brightness difference or a luminance difference between the two or more sub pixels becomes larger.

Accordingly, in order to compensate for a change in the degree of influence of the viewing angle dependency of gamma characteristic to "large/small" according to "large/small" of the curvature of the display screen or "short/long" of the viewing distance for the display screen, the improvement factor of the viewing angle dependency of gamma characteristic can be changed to "large/small".

(Embodiment 5)

While Embodiment 3 employs a form in which the viewing distance of an observer and the curvature of the liquid crystal panel 100*b* are not considered in a case where a voltage difference between the source signals applied to the sub pixel electrodes 11*a* and 11*b* is changed according to the position of the pixel P, Embodiment 5 employs a form in which, on top of the consideration of the viewing distance of an observer and/or the curvature of the liquid crystal panel 100*b*, a voltage difference between the source signals applied to the sub pixel electrodes 11*a* and 11*b* is changed according to the position of the pixel P.

FIG. 17 is a block diagram that illustrates an example of the configuration of a liquid crystal display apparatus according to Embodiment 5 of the present invention. The liquid crystal display apparatus includes a liquid crystal panel 100*c* in which pixels P are arranged in a matrix pattern in the vertical direction and the horizontal direction of a display screen. The liquid crystal panel 100*c* is the same as that used in Embodiment 3. Hereinafter, a same reference sign will be assigned to a configuration similar to that of Embodiments 1 and 3, and a part or the whole of description thereof will be omitted.

A liquid crystal display apparatus according to Embodiment 5 includes: a gate driver GD; a source driver SDb; an inter-auxiliary capacitor signal wiring CSLa; and a display control circuit 4*e* that controls display using the liquid crystal panel 100*c* by using the gate driver GD, the source driver SDb, and the inter auxiliary capacitor signal wiring CSLa.

The display control circuit 4*e* includes: an image signal input circuit 40; a gate driver control circuit 41; a source driver control circuit 42*b*; an auxiliary capacitor signal generating circuit 46*c*; a contrast gray scale setting circuit 43; a conversion table storing unit 44*b* that stores a plurality of conversion tables referred to by the contrast gray scale setting circuit 43; and a conversion table determining unit 49 that receives conversion table determination data from the outside and determines one conversion table to be referred to by the conversion table storing unit 44*b*.

The contrast gray scale setting circuit 43 refers to the conversion table determined by the conversion table determining unit 49 from the conversion table storing unit 44*b* and performs a conversion of a gray scale value illustrated in FIG. 14 according to Embodiment 3. In other words, a voltage difference between source signals applied from the source driver control circuit 42*b* to the source signal lines SL1 and SL2 through the source driver SDb is changed according to the conversion table determination data supplied from the outside.

In addition, the conversion table determining unit 49 may supply information used for determining one conversion table among a plurality of pieces of conversion table information stored in the conversion table storing unit 44*b* to the contrast gray scale setting circuit 43, and the contrast gray scale setting circuit 43 may refer to one conversion table among the plurality of conversion tables stored in the conversion table storing unit 44*b* based on the information supplied from the conversion table determining unit 49.

Next, the conversion tables and the conversion table determination data will be described.

FIG. 18 is an explanatory diagram that illustrates an example of the stored content of the conversion table storing unit 44*b*. FIG. 19 is an explanatory diagram that illustrates an example of the stored content of another conversion table storing unit. In the conversion table storing unit 44*b* and the another conversion table storing unit 44*c* illustrated in FIGS. 18 and 19, n conversion tables (LUT) according to Embodiment 3 illustrated in FIG. 14 are stored. The another conversion table storing unit 44*c* is used by replacing the conversion table storing unit 44*b* in accordance with a content represented by the conversion table determination data.

In a case where the value of the conversion table determination data corresponds to the value of L that is the viewing distance illustrated in FIG. 16A or 16B according to Embodiment 4, one of n conversion tables stored in the conversion table storing unit 44*b* is determined as a conversion table to be referred to by the contrast gray scale setting circuit 43 in accordance with "large/small" of the value of L. Similarly, in a case where the value of the conversion table determination data corresponds to the value of R that is the radius of curvature illustrated in FIG. 16A or 16B, one of the n conversion tables stored in the another conversion table storing unit 44*c* is determined as a conversion table to be referred to by the contrast gray scale setting circuit 43 in accordance with "large/small" of the value of R.

Operations after the determination of one conversion table to be referred to from the contrast gray scale setting circuit 43 are similar to those of the case of Embodiment 3 as a whole. As a result, a voltage difference between source signals applied to the source signal lines SL1 and SL2 is different for each of the areas A to I, and is optimally adjusted according to the value of L that is the viewing distance or the value of R that is the radius of curvature. Then, a voltage difference between the source signals applied to the pixel P is reflected on a voltage difference between the voltages applied to the liquid crystal layer 3 by the sub pixels SP1 and SP2.

As described above, according to this Embodiment 5, in accordance with the radius R of curvature of the display screen of the liquid crystal panel 100*c*, a voltage difference between the voltages applied to the liquid crystal layer 3 in accordance with the two or more sub pixels starting from the sub pixels SP1 and SP2 or a brightness difference or a luminance difference between the two or more sub pixels is different.

Accordingly, in order to compensate for a change in the degree of influence of the viewing angle dependency of gamma characteristic according to the curvature of the display screen, the improvement factor of the viewing angle dependency of gamma characteristic can be changed.

In addition, according to Embodiment 5, in accordance with the viewing distance L for the display screen of the liquid crystal panel 100c, a voltage difference between the voltages applied to the liquid crystal layer 3 in accordance with two or more sub pixels starting from the sub pixels SP1 and SP2 or a brightness difference or a luminance difference between the two or more sub pixels is different according to the viewing distance L of the display screen of the liquid crystal panel 100c.

Accordingly, in order to compensate for a change in the degree of influence of the viewing angle dependency of gamma characteristic according to the viewing distance L for the display screen, the improvement factor of the viewing angle dependency of gamma characteristic can be changed.

It is to be noted that, as used herein and in the appended claims, the singular forms "a", "an", and "the" include plural referents unless the context clearly dictates otherwise.

The embodiments described here are examples in all the points and should not be considered for the purpose of limitations. The scope of the present invention is not the meaning described above but is intended to include a scope that is disclosed in the claims and is equivalent to the claims and all the changes within the scope. In addition, the technical aspects described in the embodiments may be combined together.

The invention claimed is:

1. A liquid crystal display apparatus, comprising:
a liquid crystal layer; and
a plurality of electrode pairs used for applying voltages to the liquid crystal layer,
wherein pixels partitioned to include the electrode pairs are arranged in a matrix pattern,
at least two sub pixels partitioned to include at least one of the electrode pairs are included in each of the pixels, and
a voltage difference between a voltage applied to the liquid crystal layer by the electrode pairs partitioning one sub pixel of the at least two sub pixels included in one pixel and a voltage applied to the liquid crystal layer by the electrode pairs partitioning another sub pixel of the at least two sub pixels included in the one pixel is different according to an arrangement position of the pixel in a row direction and/or a column direction of the matrix.

2. The liquid crystal display apparatus according to claim 1, wherein
the voltage difference increases as the arrangement position of the pixel is further separate from a center portion in a row direction and/or a column direction of the matrix.

3. The liquid crystal display apparatus according to claim 2, further comprising:
a liquid crystal panel which has the liquid crystal layer and the electrode pairs and includes a display screen curved toward a front side,
wherein the voltage difference is different according to a curvature of the display screen of the liquid crystal panel.

4. The liquid crystal display apparatus according to claim 3, wherein
the display screen of the liquid crystal panel is curved to be convex toward the front side, and
the voltage difference is larger as the curvature is larger.

5. The liquid crystal display apparatus according to claim 3, wherein
the voltage difference is different according to a distance from the center portion of the display screen of the liquid crystal panel to a position separate in a direction of a normal line on the front side of the display screen.

6. The liquid crystal display apparatus according to claim 5, wherein
the display screen of the liquid crystal panel is curved to be convex toward the front side, and
the voltage difference is larger as the distance is shorter.

7. The liquid crystal display apparatus according to claim 1, wherein
each of the at least two sub pixels is partitioned to include an electrode pair of a sub pixel electrode and an opposing electrode facing each other through the liquid crystal layer,
further comprising:
a switching element disposed with respect to each of the at least two sub pixels; and
at least two data signal lines used for applying data signals to the sub pixel electrodes through the switching elements.

8. The liquid crystal display apparatus according to claim 7, further comprising:
a reception unit that receives image data;
a storage unit that stores, for each of divisions acquired by dividing arrangement positions of the pixels into a plurality of parts, a correspondence relation between a gray scale value and a plurality of the gray scale values having mutually-different magnitudes;
an image signal converting unit that converts a gray scale value based on the image data received by the reception unit into a plurality of gray scale values having mutually-different magnitudes based on a division to which the arrangement position of the pixel belongs and a stored content of the storage unit; and
a data signal line driving circuit that applies data signals according to the plurality of gray scale values converted by the image signal converting unit to the at least two data signal lines.

9. The liquid crystal display apparatus according to claim 1, wherein
each of the at least two sub pixels is partitioned to include an electrode pair of a sub pixel electrode and an opposing electrode facing each other through the liquid crystal layer, an insulating layer, and an electrode pair of an auxiliary capacitor electrode and an auxiliary capacitor opposing electrode facing each other through the insulating layer, and
the sub pixel electrode and the auxiliary capacitor electrode are electrically connected,
further comprising:
at least two auxiliary capacitor signal lines used for applying voltage signals to the auxiliary capacitor opposing electrode.

10. The liquid crystal display apparatus according to claim 9, further comprising:
an auxiliary capacitor signal line driving circuit that applies voltage signals to the auxiliary capacitor signal lines,
wherein the voltage signals applied to specific two auxiliary capacitor signal lines by the auxiliary capacitor signal line driving circuit have opposite polarities and have amplitudes different according to the arrangement position of the pixel.

11. A liquid crystal display apparatus, comprising:
a liquid crystal layer; and
a plurality of electrode pairs used for applying a voltage to the liquid crystal layer, wherein pixels partitioned to include the electrode pairs are arranged in a matrix pattern, at least two sub pixels partitioned to include at least one of the electrode pairs are included in each of the pixels, and a brightness difference or a luminance difference between a brightness or a luminance of one sub pixel of the at least two sub pixels included in one pixel and a brightness or a luminance of another sub pixel of the at least two sub pixels included in the one pixel is different according to an arrangement position of the pixel in a row direction and/or a column direction of the matrix.

12. The liquid crystal display apparatus according to claim 11, wherein
the brightness difference or the luminance difference increases as the arrangement position of the pixel is further separate from a center portion in a row direction and/or a column direction of the matrix.

13. The liquid crystal display apparatus according to claim 12, further comprising:
a liquid crystal panel which has the liquid crystal layer and the electrode pairs and includes a display screen curved toward a front side,
wherein the brightness difference or the luminance difference is different according to a curvature of the display screen of the liquid crystal panel.

14. The liquid crystal display apparatus according to claim 13, wherein
the display screen of the liquid crystal panel is curved to be convex toward the front side, and
the brightness difference or the luminance difference is larger as the curvature is larger.

15. The liquid crystal display apparatus according to claim 13, wherein
the brightness difference or the luminance difference is different according to a distance from the center portion of the display screen of the liquid crystal panel to a position separate in a direction of a normal line on the front side of the display screen.

16. The liquid crystal display apparatus according to claim 15, wherein
the display screen of the liquid crystal panel is curved to be convex toward the front side, and
the brightness difference or the luminance difference is larger as the distance is shorter.

17. The liquid crystal display apparatus according to claim 11, wherein
each of the at least two sub pixels is partitioned to include an electrode pair of a sub pixel electrode and an opposing electrode facing each other through the liquid crystal layer,
further comprising:
a switching element disposed with respect to each of the at least two sub pixels; and
at least two data signal lines used for applying data signals to the sub pixel electrodes through the switching elements.

18. The liquid crystal display apparatus according to claim 17, further comprising:
a reception unit that receives image data;
a storage unit that stores, for each of divisions acquired by dividing arrangement positions of the pixels into a plurality of parts, a correspondence relation between a gray scale value and a plurality of the gray scale values having mutually-different magnitudes;

an image signal converting unit that converts a gray scale value based on the image data received by the reception unit into a plurality of gray scale values having mutually-different magnitudes based on a division to which the arrangement position of the pixel belongs and a stored content of the storage unit; and a data signal line driving circuit that applies data signals according to the plurality of gray scale values converted by the image signal converting unit to the at least two data signal lines.

19. The liquid crystal display apparatus according to claim 11, wherein
each of the at least two sub pixels is partitioned to include an electrode pair of a sub pixel electrode and an opposing electrode facing each other through the liquid crystal layer, an insulating layer, and an electrode pair of an auxiliary capacitor electrode and an auxiliary capacitor opposing electrode facing each other through the insulating layer, and
the sub pixel electrode and the auxiliary capacitor electrode are electrically connected,
further comprising:
at least two auxiliary capacitor signal lines used for applying voltage signals to the auxiliary capacitor opposing electrode.

20. The liquid crystal display apparatus according to claim 19, further comprising:
an auxiliary capacitor signal line driving circuit that applies voltage signals to the auxiliary capacitor signal lines,
wherein the voltage signals applied to specific two auxiliary capacitor signal lines by the auxiliary capacitor signal line driving circuit have opposite polarities and have amplitudes different according to the arrangement position of the pixel.

21. A method of driving a liquid crystal display apparatus which comprises a liquid crystal layer and a plurality of electrode pairs used for applying voltages to the liquid crystal layer, and in which pixels partitioned to include the electrode pairs are arranged in a matrix pattern and at least two sub pixels partitioned to include one or two electrode pairs are included in each of the pixels,
wherein a voltage difference between a voltage applied to the liquid crystal layer by the electrode pairs partitioning one sub pixel of the at least two sub pixels included in one pixel and a voltage applied to the liquid crystal layer by the electrode pairs partitioning another sub pixel of the at least two sub pixels included in the one pixel is different according to an arrangement position of the pixel in a row direction and/or a column direction of a matrix.

22. A method of driving a liquid crystal display apparatus which comprises a liquid crystal layer and a plurality of electrode pairs used for applying voltages to the liquid crystal layer, and in which pixels partitioned to include the electrode pairs are arranged in a matrix pattern and at least two sub pixels partitioned to include one or two electrode pairs are included in each of the pixels,
wherein a brightness difference or a luminance difference between a brightness or a luminance of one sub pixel of the at least two sub pixels included in one pixel and a brightness or a luminance of another sub pixel of the at least two sub pixels included in the one pixel is different according to an arrangement position of the pixel in a row direction and/or a column direction of the matrix.

* * * * *